(12) United States Patent
Burke et al.

(10) Patent No.: US 11,175,948 B2
(45) Date of Patent: *Nov. 16, 2021

(54) GROUPING OF TASKS FOR DISTRIBUTION AMONG PROCESSING ENTITIES

(71) Applicant: INTERNATIONAL BUSINESS MACHINES CORPORATION, Armonk, NY (US)

(72) Inventors: Seamus J. Burke, Tucson, AZ (US); Trung N. Nguyen, Tucson, AZ (US); Louis A. Rasor, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 278 days.

This patent is subject to a terminal disclaimer.

(21) Appl. No.: 16/297,453

(22) Filed: Mar. 8, 2019

(65) Prior Publication Data
US 2019/0205168 A1    Jul. 4, 2019

Related U.S. Application Data

(63) Continuation of application No. 15/172,846, filed on Jun. 3, 2016, now Pat. No. 11,029,998.

(51) Int. Cl.
*G06F 9/46* (2006.01)
*G06F 9/48* (2006.01)
*H04L 29/08* (2006.01)

(52) U.S. Cl.
CPC ........ *G06F 9/4881* (2013.01); *H04L 67/1097* (2013.01)

(58) Field of Classification Search
CPC ........................... G06F 9/4881; H04L 67/1097

USPC ........................................................ 718/104
See application file for complete search history.

(56) References Cited

U.S. PATENT DOCUMENTS

| 4,809,157 | A  | 2/1989  | Eilert et al.    |
|-----------|----|---------|------------------|
| 5,349,656 | A  | 9/1994  | Kaneko et al.    |
| 5,465,335 | A  | 11/1995 | Anderson         |
| 6,748,593 | B1 | 6/2004  | Brenner et al.   |
| 7,065,623 | B2 | 6/2006  | Chen et al.      |
| 7,093,258 | B1 | 8/2006  | Miller et al.    |
| 7,191,207 | B2 | 3/2007  | Blount et al.    |
| 7,290,099 | B2 | 10/2007 | Budaya et al.    |
| 8,676,748 | B2 | 3/2014  | Budaya et al.    |
| 8,732,439 | B2 | 5/2014  | Lippett          |
| 8,752,060 | B2 | 6/2014  | Hsieh et al.     |
| 8,954,985 | B2 | 2/2015  | Edelstein et al. |

(Continued)

FOREIGN PATENT DOCUMENTS

CN            101986272 A    3/2011

OTHER PUBLICATIONS

Notice of Allowance dated Sep. 11, 2019, pp. 10, for U.S. Appl. No. 15/172,841.

(Continued)

*Primary Examiner* — Bradley A Teets
(74) *Attorney, Agent, or Firm* — Konrad Raynes Davda & Victor LLP; Rabindranath Dutta

(57) ABSTRACT

A plurality of processing entities are maintained. A plurality of task control block (TCB) groups are generated, wherein each of the plurality of TCB groups are restricted to one or more different processing entities of the plurality of processing entities. A TCB is assigned to one of the plurality of TCB groups, at TCB creation time.

18 Claims, 27 Drawing Sheets

(56) References Cited

U.S. PATENT DOCUMENTS

| | | | |
|---|---|---|---|
| 8,972,699 | B2 | 3/2015 | Lin et al. |
| 9,043,550 | B2 | 5/2015 | Benhase et al. |
| 9,058,217 | B2 | 6/2015 | Ash et al. |
| 9,158,713 | B1 | 10/2015 | Chudgar et al. |
| 9,201,598 | B2 | 12/2015 | Benhase et al. |
| 9,361,241 | B2 | 6/2016 | Benhase et al. |
| 9,658,888 | B2 | 5/2017 | Benhase et al. |
| 10,185,593 | B2 | 1/2019 | Burke et al. |
| 2002/0087618 | A1 | 7/2002 | Bohm et al. |
| 2002/0087736 | A1 | 7/2002 | Martin |
| 2002/0099752 | A1 | 7/2002 | Markos et al. |
| 2005/0114566 | A1* | 5/2005 | Chen ............ G06F 11/2076 710/38 |
| 2005/0210468 | A1 | 9/2005 | Chung et al. |
| 2006/0041780 | A1 | 2/2006 | Budaya et al. |
| 2007/0220517 | A1 | 9/2007 | Lippett |
| 2008/0133738 | A1 | 6/2008 | Knauerhase et al. |
| 2009/0222621 | A1 | 9/2009 | Ash et al. |
| 2010/0293353 | A1 | 11/2010 | Sonnier et al. |
| 2011/0107344 | A1 | 5/2011 | Kim et al. |
| 2012/0124214 | A1 | 5/2012 | Karger et al. |
| 2013/0167152 | A1 | 6/2013 | Jeong |
| 2013/0246561 | A1 | 9/2013 | Paramasivam et al. |
| 2013/0247067 | A1 | 9/2013 | Schmit et al. |
| 2013/0326537 | A1 | 12/2013 | Edelsten et al. |
| 2014/0026141 | A1 | 1/2014 | Lippett |
| 2014/0082621 | A1 | 3/2014 | Fitzgerald et al. |
| 2014/0082629 | A1 | 3/2014 | Ash et al. |
| 2014/0207741 | A1 | 7/2014 | Morsi et al. |
| 2015/0220370 | A1 | 8/2015 | Ujibashi et al. |
| 2015/0261567 | A1 | 9/2015 | Kim et al. |
| 2015/0293794 | A1 | 10/2015 | Levin et al. |
| 2015/0301854 | A1 | 10/2015 | Park et al. |
| 2015/0309842 | A1 | 10/2015 | Wu et al. |
| 2016/0036879 | A1 | 2/2016 | Vadura et al. |
| 2016/0139953 | A1 | 5/2016 | Nguyen et al. |
| 2016/0344817 | A1 | 11/2016 | Renzullo |
| 2017/0351549 | A1 | 12/2017 | Burke et al. |
| 2017/0353396 | A1 | 12/2017 | Burke et al. |
| 2019/0056974 | A1 | 2/2019 | Burke et al. |
| 2019/0138357 | A1 | 5/2019 | Burke et al. |

OTHER PUBLICATIONS

Notice of Allowance dated Oct. 2, 2019, pp. 33, for U.S. Appl. No. 15/172,846.
Office Action dated Sep. 20, 2019, pp. 25, for U.S. Appl. No. 16/239,194, filed Jan. 3, 2019.
Response to Office Action 1 for U.S. Appl. No. 16/283,553, dated Mar. 30, 2020, 12 pp.
Office Action 1 for U.S. Appl. No. 16/283,553, dated Dec. 30, 2019, 39 pp.
Office Action dated Jun. 28, 2018, pp. 31, for U.S. Appl. No. 15/172,841.
Response dated Sep. 27, 2018, pp. 11, to Office Action dated Jun. 28, 2018, pp. 31, for U.S. Appl. No. 15/172,841.
Notice of Allowance dated Nov. 21, 2018, pp. 13, for U.S. Appl. No. 15/172,841.
U.S. Appl. No. 16/283,553, filed Feb. 22, 2019.
Office Action dated Dec. 1, 2017, pp. 16, for U.S. Appl. No. 15/172,852, filed Jun. 3, 2016.
Response dated Mar. 1, 2018, pp. 12, to Office Action dated Dec. 1, 2017, pp. 16, for U.S. Appl. No. 15/172,852, filed Jun. 3, 2016.
Amendment dated May 2, 2018, pp. 10, for U.S. Appl. No. 15/172,852, filed Jun. 3, 2016.
Notice of Allowance dated May 22, 2018, pp. 32, for U.S. Appl. No. 15/172,852.
Notice of Allowance dated Sep. 12, 2018, pp. 18, for U.S. Appl. No. 15/172,852.
U.S. Appl. No. 16/239,194, filed Jan. 3, 2019.
English translation of Chinese patent CN101986272 dated Mar. 16, 2011.
List of IBM Patents or Patent Applications treated as related, dated Mar. 7, 2019, 2 pp.
Office Action dated Aug. 18, 2020, pp. 39, U.S. Appl. No. 15/172,846.
Final Office Action dated Aug. 5, 2020, pp. 26, for U.S. Appl. No. 15/680,598.
Final Office Action 1 for U.S. Appl. No. 16/283,553, 20 pp., dated Jul. 9, 2020.
Response dated Nov. 8, 2019, pp. 12, to Final Office Action dated Aug. 8, 2019, pp. 20, for U.S. Appl. No. 15/680,598.
Office Action dated Mar. 18, 2020, pp. 21, for U.S. Appl. No. 15/680,598.
Notice of Allowance dated Mar. 25, 2020, ,pp. 20, for U.S. Appl. No. 16/239,194.
Response dated Dec. 20, 2019, pp. 2, to Office Action dated Sep. 20, 2019, pp. 25, for U.S. Appl. No. 16/239,194.
Amendment dated Nov. 5, 2020, pp. 11, to Final Office Action dated Aug. 5, 2020, pp. 26, for U.S. Appl. No. 15/680,598.
Response dated Nov. 18, 2020, pp. 10, to Office Action dated Aug. 18, 2020, pp. 39, U.S. Appl. No. 15/172,846.
Office Action 1 for U.S. Appl. No. 15/680,598, dated Apr. 5, 2019, 45 pp.
Notice of Allowance dated Jun. 12, 2019, pp. 6, for U.S. Appl. No. 15/172,846.
Response dated Jul. 5, 2019, pp. 11, to Office Action dated Apr. 5, 2019, pp. 45, for U.S. Appl. No. 15/680,598.
Final Office Action dated Aug. 8, 2019, pp. 20, for U.S. Appl. No. 15/680,598.
Notice of Allowance dated Apr. 30, 2019, pp. 55, for U.S. Appl. No. 15/172,841.
Notice of Allowance dated Jan. 25, 2021, pp. 14, for U.S. Appl. No. 15/172,846.
Notice of Allowance dated Dec. 21, 2020, pp. 29, for U.S. Appl. No. 16/283,553.
Response dated Jun. 18, 2020, pp. 12, to Office Action dated Mar. 18, 2020, pp. 21, for U.S. Appl. No. 15/680,598.
Response to Final Office Action 1 for U.S. Appl. No. 16/283,553, 12 pp., dated Oct. 9, 2020.
Office Action 1 for U.S. Appl. No. 15/172,846, dated Dec. 15, 2017, 37 pp.
Response to Office Action 1 for U.S. Appl. No. 15/172,846, dated Mar. 15, 2018, 12 pp.
Final Office Action 1 for U.S. Appl. No. 15/172,846, dated Jul. 5, 2018, 58 pp.
Response to Final Office Action 1 for U.S. Appl. No. 15/172,846, dated Oct. 5, 2018, 13 pp.
Notice of Allowance 1 for U.S. Appl. No. 15/172,846, dated Dec. 19, 2018, 13 pp.
Office Action 5 for U.S. Appl. No. 15/680,598, dated Apr. 1, 2021, 14 pp.
Rasley, J., et al., "Efficient Queue Management for Cluster Scheduling", Apr. 2016, EuroSys '16: Proceedings of the Eleventh European Conference on Computer Systems, 15 pp.
Response dated Jul. 1, 2021, pp. 13, to Office Action dated Apr. 1, 2021, pp. 14, for U.S. Appl. No. 15/680,598.
Notice of Allowance dated Jul. 22, 2021, pp. 17, for U.S. Appl. No. 15/680,598.

* cited by examiner

GROUPING OF TASKS FOR DISTRIBUTION AMONG PROCESSING ENTITIES

CROSS-REFERENCE TO RELATED APPLICATION

This application is a continuation of U.S. patent application Ser. No. 15/172,846, filed Jun. 3, 2016, which application is incorporated herein by reference in its entirety.

BACKGROUND

1. Field

Embodiments relate to the grouping of tasks for distribution among processing entities.

2. Background

A storage system may control access to storage for one or more host computational devices that may be coupled to the storage system over a network. A storage management application that executes in the storage system may manage a plurality of storage devices, such as disk drives, tape drives, flash drives, direct access storage devices (DASD), etc., that are coupled to the storage system. A host may send Input/Output (I/O) commands to the storage system and the storage system may execute the I/O commands to read data from the storage devices or write data to the storage devices.

The storage system may include two or more servers, where each server may be referred to as a node, a storage server, a processor complex, a Central Processor Complex (CPC), or a Central Electronics Complex (CEC). Each server may be included in a cluster. Each server may have a plurality of processor cores and the servers may share the workload of the storage system. In a two server configuration of the storage system, either server can failover to the other if there is a failure or a planned downtime for one of the two servers. For example, a first server may failover to the other is there is a failure of a second server.

A computational device, such as a host or a server of storage system, may include a plurality of processors and form a multiprocessing system. Non-uniform memory access (NUMA) is a computer memory design used in multiprocessing, where the memory access time depends on the memory location relative to the processor. Under NUMA, a processor may access its own local memory faster than non-local memory (memory local to another processor or memory shared between processors). The benefits of NUMA may be limited to particular workloads, notably on servers where the data is often associated strongly with certain tasks or users. A task control block (TCB) is a data structure in an operating system or some other control program that includes the information needed to manage a particular process or a plurality of processes.

U.S. Patent Publication 2014/0026141 discusses a multi-core processor system and at least discusses dispatch queues associated with task control blocks. U.S. patent publication 2011/0107344 at least discusses a multi-core processor system which provides a method for load balancing. U.S. Pat. No. 9,058,217 at least discusses a preferential central processing unit (CPU) utilization for tasks, in which a set of like tasks to be performed is organized into a first group. Upon a determined imbalance between dispatch queue depths greater than a predetermined threshold, the set of like tasks is reassigned to an additional group.

SUMMARY OF THE PREFERRED EMBODIMENTS

Provided are a method, a system, and a computer program product in which a plurality of processing entities are maintained. A plurality of task control block (TCB) groups are generated, wherein each of the plurality of TCB groups are restricted to one or more different processing entities of the plurality of processing entities. A TCB is assigned to one of the plurality of TCB groups, at TCB creation time.

In additional embodiments, a TCB category attribute is associated with each of a plurality of TCBs. In response to determining that restrictions are to be placed on allocations of processing entities for a newly created TCB, an indication is made in corresponding TCB category attributes that the newly created TCB is a special type of TCB.

In further embodiments, a determination is made that a selected TCB has to be dispatched for processing. In response to determining that a TCB category attribute of the selected TCB indicates that the selected TCB is of the special type of TCB, a determination is made of the TCB group of the selected TCB and the selected TCB is dispatched in accordance with the restrictions on processing entities of the TCB group.

In additional embodiments, a first group of the plurality of TCB groups includes TCBs associated with a first type of operations, wherein a second group of the plurality of TCB groups includes TCBs associated with a second type of operations.

In further embodiments, a first set of processing entities are allocated for the first group. A second set of processing entities are allocated for the second group.

In additional embodiments, allocation of the plurality of processing entities is balanced among the plurality of TCB groups, wherein a selected TCB group is restricted to a maximum number of processing units.

In further embodiments, a selected TCB group is allocated specifically identified processing units that are resident on a same module.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Task Queuing and Dispatching Mechanisms

A Central Processing Unit (CPU) complex of a multi-processor based system may be comprised of many processor chips. A processor chip may have multiple cores and each core may execute several threads. If the CPU complex is based on a NUMA architecture, then under the NUMA architecture, a processor (e.g., a CPU) may access its own local memory faster than non-local memory, where non-local memory is memory that is local to another processor or memory that is shared between processors. As a result, memory access time may not be uniform across all of memory so it may be desirable to improve data locality (i.e., have a better cache hit ratio). In addition, cache invalidation to maintain coherency is more expensive across different group of processor chips. Therefore, it may be desirable for a task scheduler to dispatch tasks to different processors via mechanisms that improve data locality and minimize cache invalidation traffic while at the same time the mechanisms make effective use of the processing resources of the plurality of processors when there are many tasks to run.

In certain embodiments, a plurality of ordered lists of dispatch queues corresponding to a plurality of processing entities (e.g., CPUs) are maintained, where each dispatch queue includes one or more task control block (TCB) to perform tasks. The ordered list of dispatch queues for a processing entity (also referred to as a processing unit) provides highest precedence to TCBs in the primary dispatch queue of a processing entity. Additionally, precedence is provided to those dispatch queues that correspond to those processing entities in a same group as the processing entity over those processing entities that are in a different group from the processing entity. In certain embodiments, by defining which dispatch queues a processing entity may look into for locating TCBs to execute, and dispatching a TCB from a dispatch queue when the dispatch queue has more than a threshold value of the number of TCBs, the TCBs that are dispatched are balanced across the processing entities. Furthermore, a TCB that was dispatched earlier is dispatched on the processing entity that processed the TCB last. As a result, data locality is increased and cache invalidation traffic is reduced.

Figure 1:
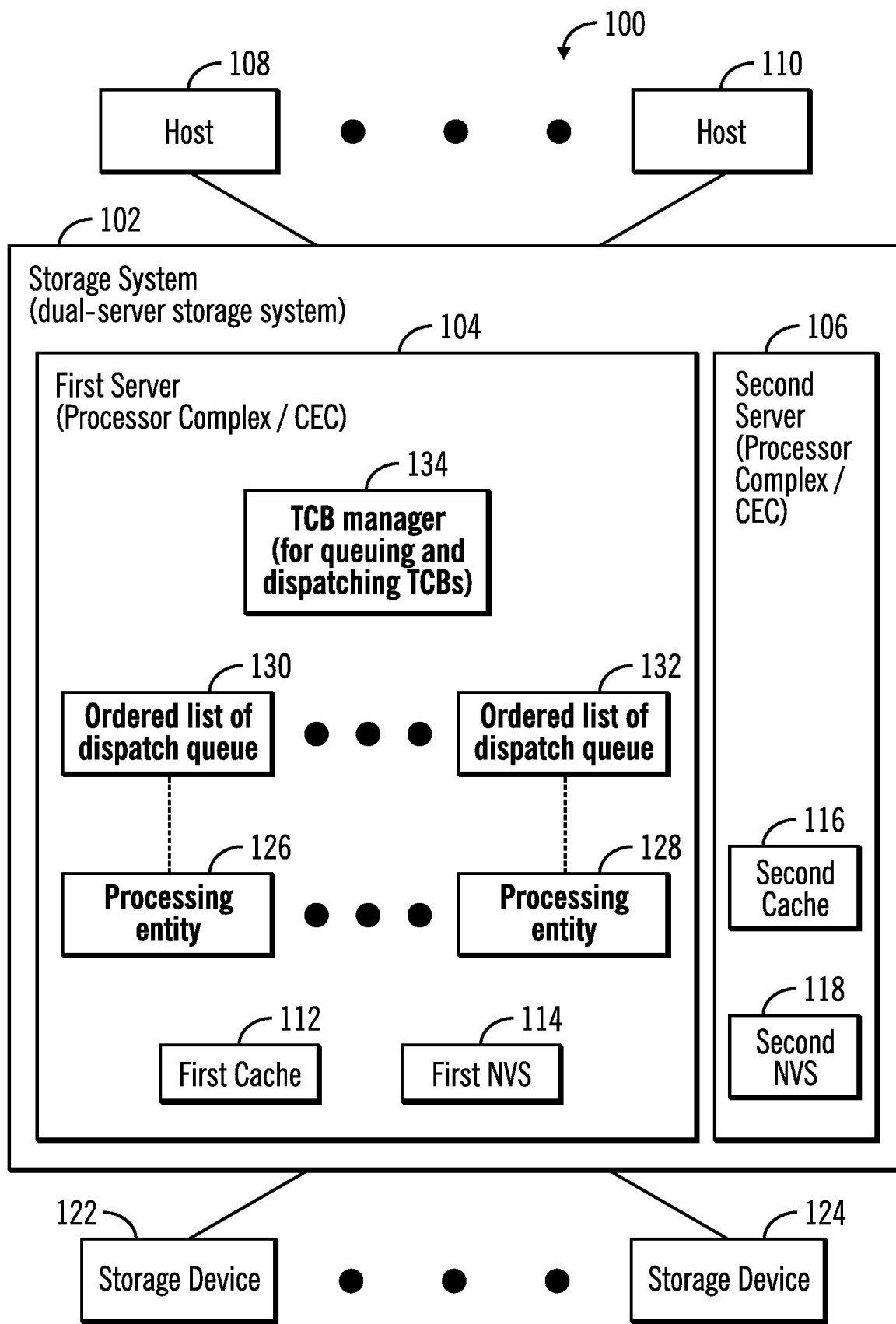
FIG. 1 illustrates a block diagram of a computing environment comprising a storage system comprising a first server and a second server in which a task control block manager is implemented, and where the storage system communicates with a plurality of hosts over a network, in accordance with certain embodiments.

FIG. 1 illustrates a block diagram of a computing environment 100 comprising a storage system 102 comprising a first server 104 and a second server 106, where the storage system 102 communicates with a plurality of hosts 108, 110 over a network, in accordance with certain embodiments.

The storage system 102, the servers 104, 106 and the hosts 108, 110 may comprise any suitable computational device including those presently known in the art, such as, a personal computer, a workstation, a server, a mainframe, a hand held computer, a palm top computer, a telephony device, a network appliance, a blade computer, a processing device, a controller, etc. The plurality of servers 104, 106 may provide redundancy because if one server undergoes a failure from which recovery is not possible, an alternate server may perform the functions of the server that failed. Each of the plurality of servers 104, 106 may be referred to as a processing complex or a central electronics complex (CEC) and may include one or more processors and/or processor cores. The storage system 102 may also be referred to as a dual-server storage system.

The storage system 102, the servers 104, 106 and the hosts 108, 110 may be elements in any suitable network, such as, a storage area network, a wide area network, the Internet, an intranet. In certain embodiments, storage system 102, the servers 104, 106 and the hosts 108, 110 may be elements in a cloud computing environment.

The first server 104 includes memory comprising a first cache 112 and a first NVS 114, and the second server 106 includes memory comprising a second cache 116 and a second NVS 118.

In certain embodiments, the cache 112, 116 may comprise a write cache partitioned into one or more ranks, where each rank may include one or more storage tracks. The cache 112, 116 may be any suitable cache known in the art or developed in the future. In some embodiments, the cache 112, 116 may be implemented with a volatile memory and/or non-volatile memory. The cache 112, 116 may store both modified and unmodified data, where the cache 112,116 may periodically destage (i.e., move) data from the cache 112, 116 to one or more storage devices 122, 124 controlled by the servers 104, 106. The NVS 114, 118 may also be referred to as a "persistent" cache and is implemented with non-volatile memory that may or may not utilize external power to retain data stored therein. In some embodiments, a backup power source, such as a battery, supplies the NVS 114, 118 with power to retain the data stored therein in case of power loss. The NVS 114, 118 may store modified data. An application is made aware that an I/O operation is complete once data has successfully been written to cache and the NVS. Data integrity and availability is maintained by retaining two copies of the data until it is hardened to disk, one copy in cache on one server and the second in NVS of the other server. NVS is protected by battery backup. Normal access to the data is from the copy retained in the cache It should be noted that the storage system 102 may be configured and accessed in many different ways. For example, virtualization may be performed to access the hardware elements of the storage system 102. Additionally, in certain embodiments, the storage system 102 may have a single server or more than two servers.

In certain embodiments, each of the servers 104, 106 may have corresponding applications and data structures implemented in each, and the applications and data structures implemented in the first server 104 are shown. The server 106 may have similar applications and data structures, and may have similar hardware, firmware, and/or software.

The first server 104 includes a plurality of processing entities 126, 128, where in certain embodiments each processing entity is a central processing unit (CPU). In certain embodiments, each processing entity 126, 128 is the lowest granularity of a processor that is configurable to execute a task corresponding to a task control block. While only two processing entities are identified by reference numerals 126, 128 in FIG. 1, it is understood that there may be more than two processing entities in the server 104.

Associated with the plurality of processing entities 126, 128 are a plurality of ordered lists of TCB dispatch queues, where the TCB dispatch queues are also referred to as ordered list of dispatch queues 130, 132. A TCB manager 134 is an application implemented in software, firmware, hardware or any combination thereof that executes in the server 104. The TCB manager 134 performs the queuing and dispatching of TCBs and in certain embodiments may be included in or associated with the operating system and/or storage management application that may execute in the server 104.

Figure 2:
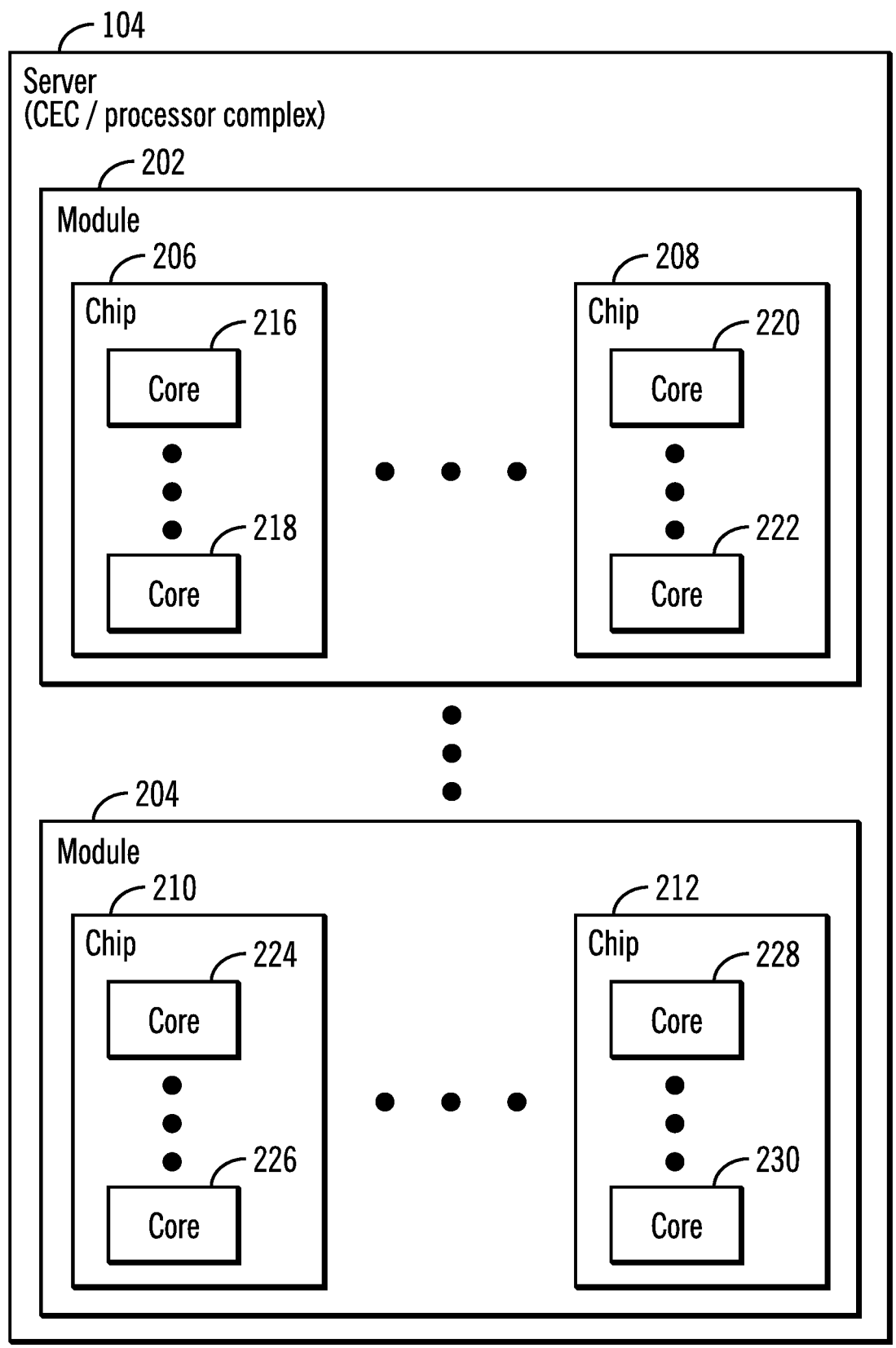
FIG. 2 illustrates a block diagram of a processor complex such as a server or a central electronics complex (CEC), in accordance with certain embodiments.

FIG. 2 illustrates a block diagram of the server 104 that comprises a processor complex or a central electronics complex (CEC), in accordance with certain embodiments. The server 104 may be comprised of a plurality of modules 202, 204 where each module is comprised of a plurality of chips 206, 208, 210, 212, and where each chip is comprised of a plurality of cores 216, 218, 220, 222, 224, 226, 228, 230 as shown in FIG. 2.

Figure 3:
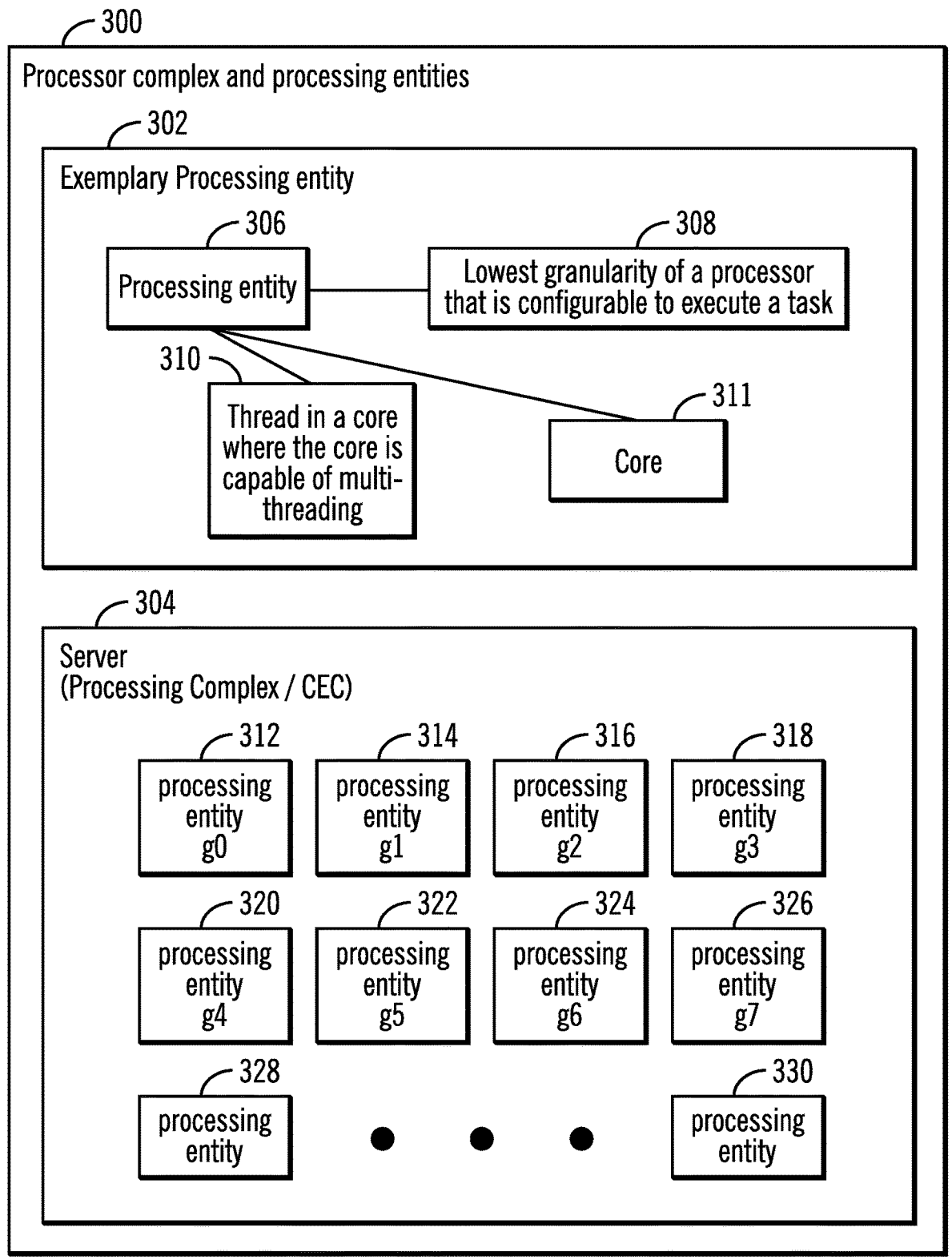
FIG. 3 illustrates a block diagram that shows a processing entity and a processor complex such as a server or a CEC, in accordance with certain embodiments.

FIG. 3 illustrates a block diagram 300 that shows an exemplary processing entity 302 and a server 304 comprising a processor complex or a CEC, in accordance with certain embodiments.

A processing entity 306 may be defined as the lowest granularity of a processor that is configurable to execute a task (as shown via reference numeral 308). The control structures of the task may be found in a TCB. For example, the processing entity 306 may be a thread in a core where the core is capable of multi-threading (as shown via reference numeral 310) or a core 311. In certain embodiments, the processing entity 306 is a CPU.

The server 304 which may correspond to the server 104 shown in FIG. 1 may be comprised of a plurality of processing entities 312, 314, 316, 318, 320, 322, 324, 326, 328, 330 that includes at least eight processing entities g0, g1, g2, g3, g4, g5, g6, g7 that are identified by reference numerals 312, 314, 316, 318, 320, 322, 324, 326 respectively.

Figure 4:
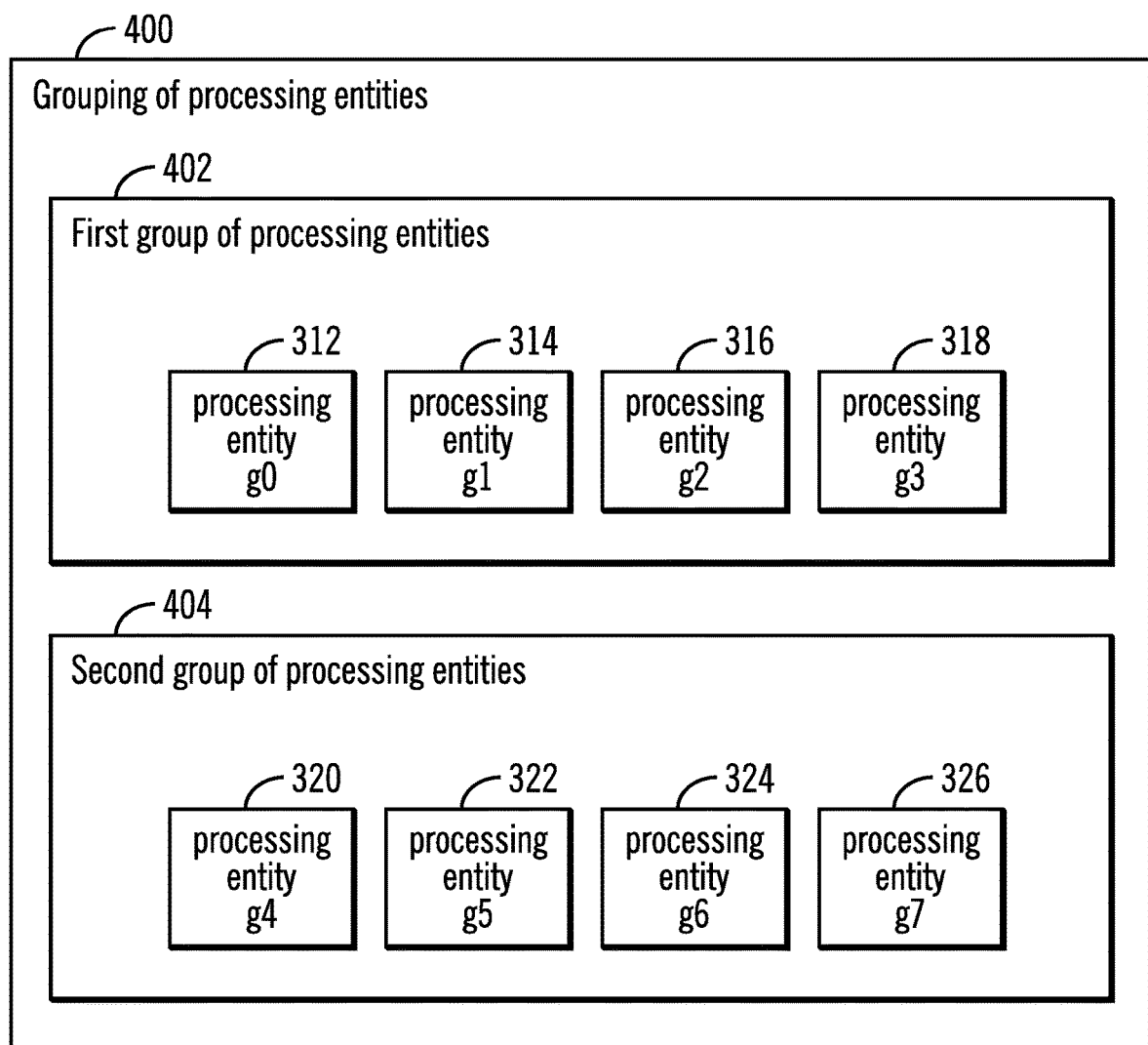
FIG. 4 illustrates a block diagram that shows exemplary groupings of processing entities, in accordance with certain embodiments.

FIG. 4 illustrates a block diagram 400 that shows exemplary groupings of processing entities, in accordance with certain embodiments. The four processing entities g0, g1, g2, g3 (identified via reference numerals 312, 314, 316, 318) of server 104 are included in a first group 402, and the four processing entities g4, g5, g6, g7 (identified by reference numerals 320, 322, 324, 326) are included in a second group 404. In certain embodiments, the first group 402 may comprise processing entities in a first chip 206 and the second group 404 may comprise processing entities in a second chip 208. In other embodiments, the first group 402 may comprise processing entities in a first module 202 and the second group 404 may comprise processing entities in a second module 204. It should be noted that processing entities within the same group are able to perform the execution of tasks of other processing entities in the same group faster, in comparison to tasks of processing entities that are in a different group, because of the sharing of memory by processing entities belonging to the same group.

Figure 5:
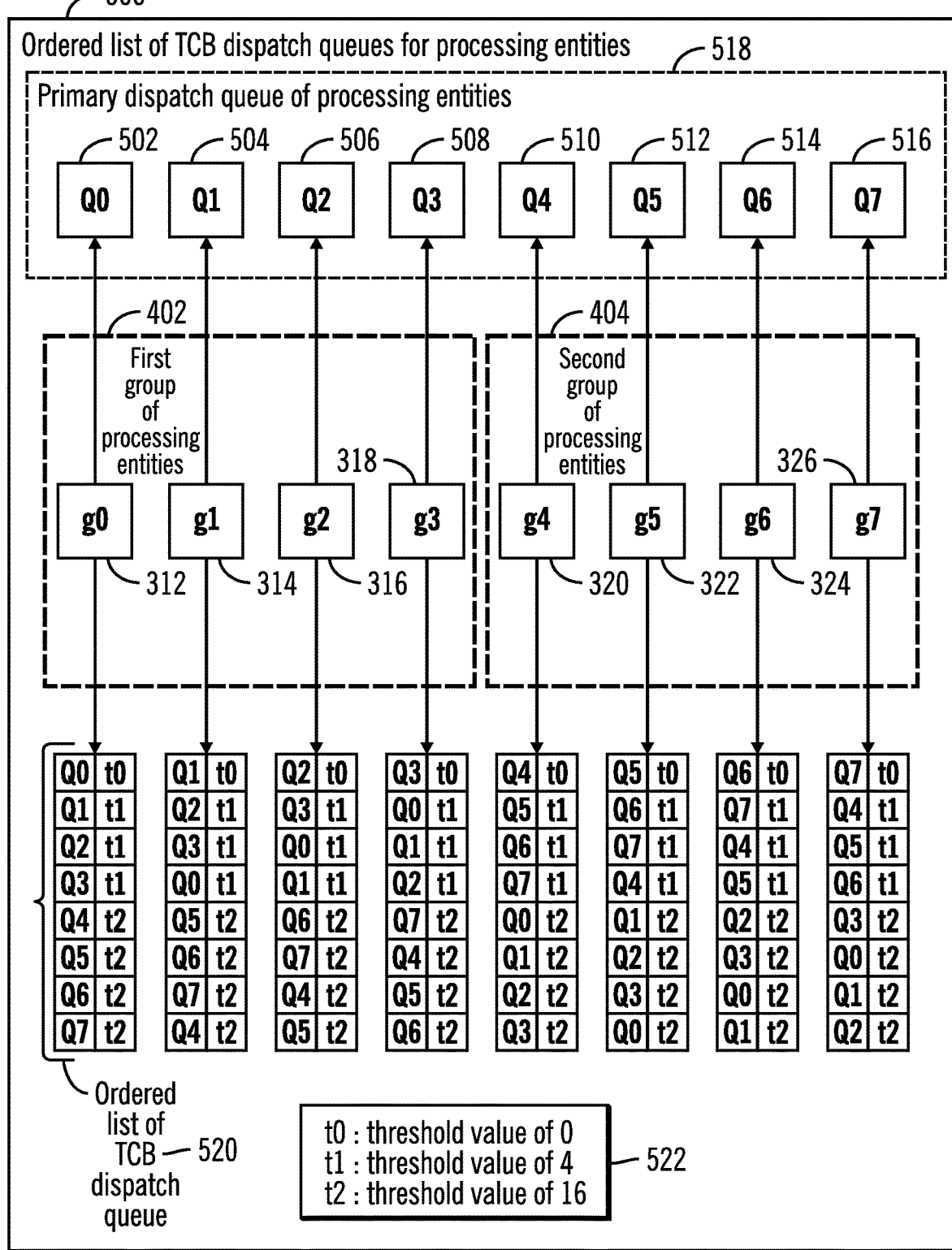
FIG. 5 illustrates a block diagram that shows ordered lists of task control block (TCB) dispatch queues for processing entities, in accordance with certain embodiments.

FIG. 5 illustrates a block diagram 500 that shows ordered lists of task control block (TCB) dispatch queues for processing entities, in accordance with certain embodiments.

FIG. 5 shows a first group 402 of processing entities g0, g1, g2, g3 (reference numerals 312, 314, 316, 318) and a second group 404 of processing entities g4, g5, g6, g7 (reference numerals 320, 322, 324, 326).

Each processing entity has a primary dispatch queue associated with it. For example Q0, Q1, Q2, Q3, Q4, Q5, Q6, Q7 (indicated via reference numerals 502, 504, 506, 508, 510, 512, 514, 516) are primary dispatch queues for processing entities g0, g1, g2, g3, g4, g5, g6, g7 (indicated via reference numerals 312, 314, 316, 318, 320, 322, 324, 326) respectively. Primary dispatch queues Q0, Q1, Q2, Q3, Q4, Q5, Q6, Q7 are collectively referred to via reference numeral 518.

Each processing entity also has an ordered list of dispatch queues, where an exemplary ordered list of dispatch queues for processing entity 312 is shown via reference numeral 520. It may be seen that the ordered list of dispatch queue 520 for the processing entity 312 includes the dispatch queues Q0, Q1, Q2, Q3, Q4, Q5, Q6, Q7 in order with corresponding threshold values t0, t1, t1, t1, t2, t2, t2, t2 respectively. In certain embodiments the threshold values t0, t1, t2 are 0, 4, 16 respectively as shown via reference numeral 522.

For each processing entity in a group, an ordered list of TCB dispatch queues that includes one or more TCB dispatch queues where the processing entity in the group looks for processing work is associated. The processing entity runs a TCB on a dispatch queue only if the dispatch queue has more TCBs than a threshold value. The first dispatch queue assigned to a processing entity has a threshold of 0. This queue is referred to as the processing entity's primary queue.

In FIG. 5 the threshold values (e.g. t0, t1, t2 as shown via reference numeral 522) are defined so that the workload can be balanced when there are many tasks to be run. The threshold values for t1, t2 should not be so small that a task is frequently moved from one group of processing entities to another group of processing entities. The thresholds may also have different values for different hierarchy of processor chips as is often seen in a NUMA based CPU complex.

In the example shown in FIG. 5, there are two groups 402, 404 of processing entities associated with 8 dispatch queues. A processing entity in each group will look into their primary queue first, where the primary queue has threshold t0=0 (reference numeral 522). If there is no work then the processing entity will look in other queues listed in the order in the ordered list of TCB queues (e.g., reference numeral 520).

Figure 6:
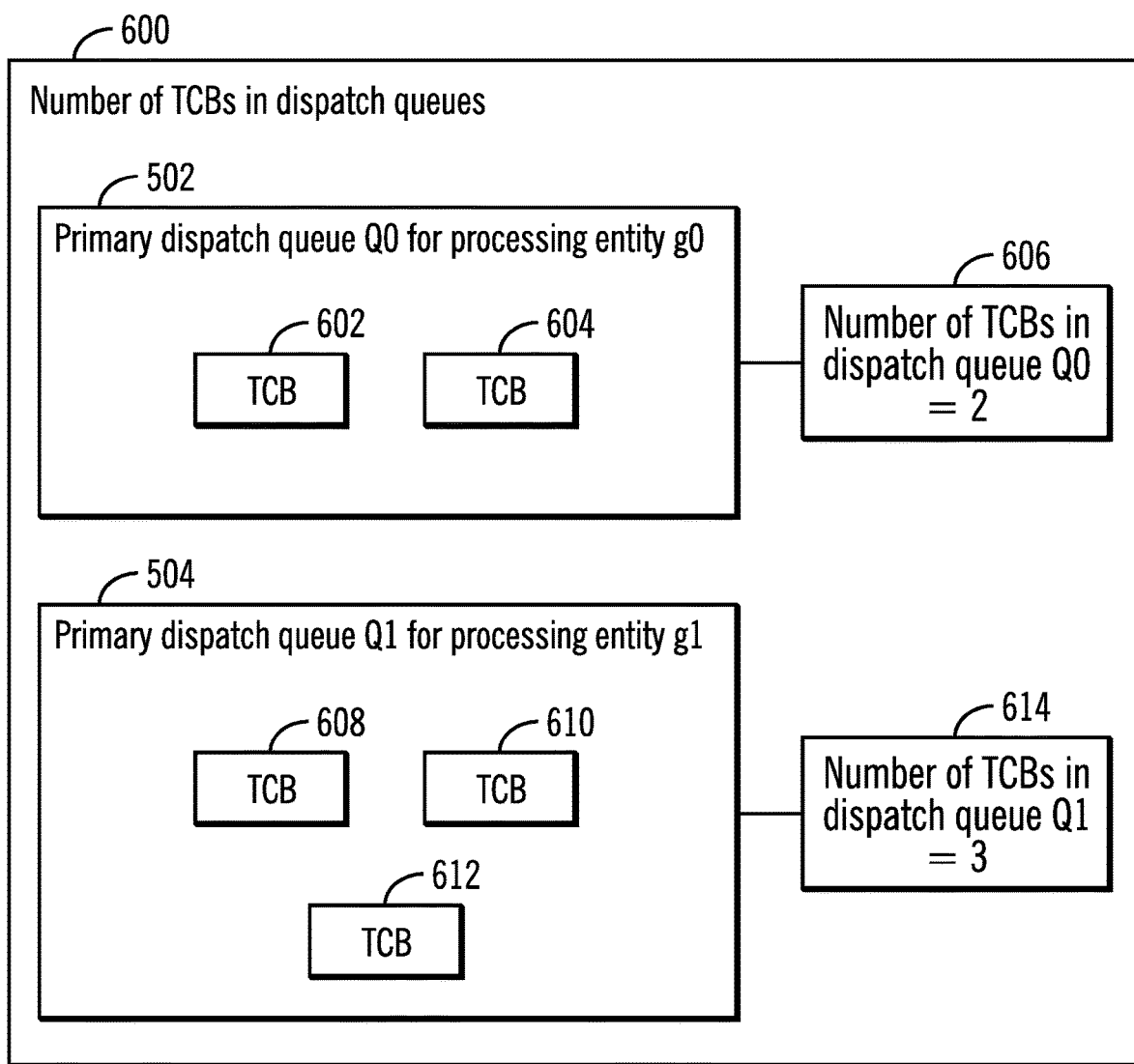
FIG. 6 illustrates a block diagram that shows exemplary number of TCBs in dispatch queues, in accordance with certain embodiments.
Figure 7:
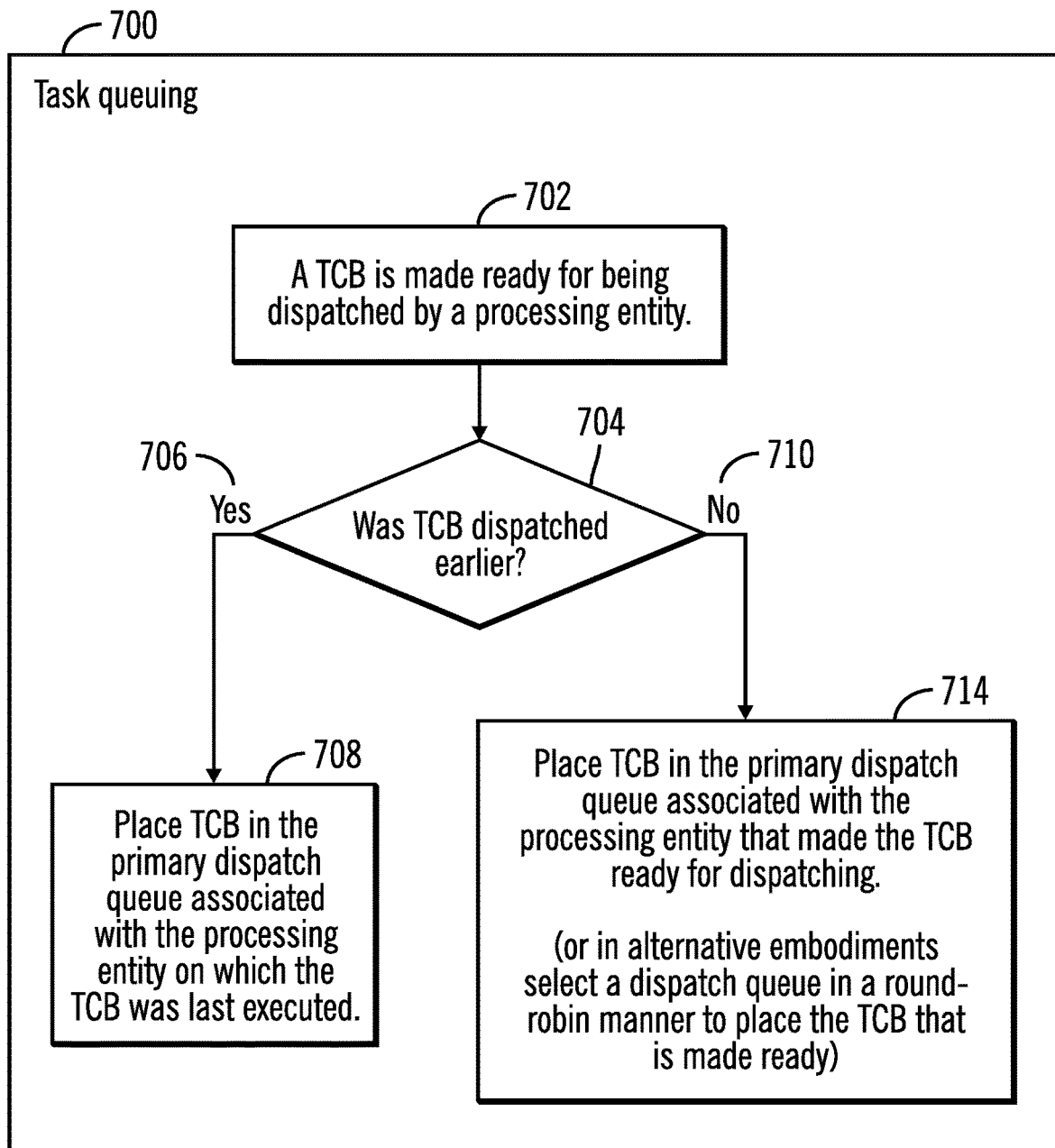
FIG. 7 illustrates a flowchart that shows operations for task queuing, in accordance with certain embodiments.
Figure 8:
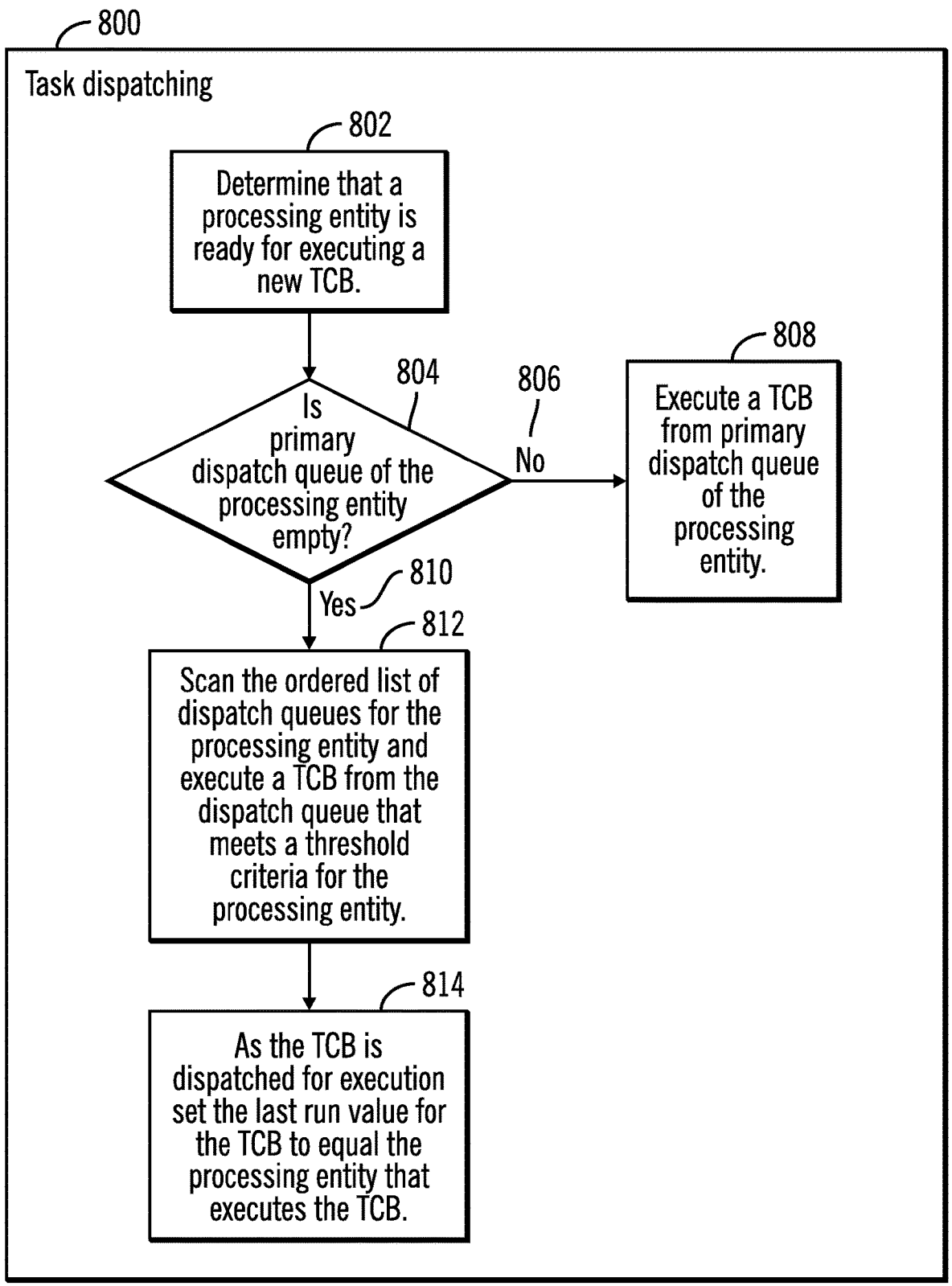
FIG. 8 illustrates a flowchart that shows operations for task dispatching, in accordance with certain embodiments.

FIGS. 6, 7, 8 will illustrate how the data structures in FIG. 5 are populated and used in certain embodiments.

FIG. 6 illustrates a block diagram 600 that shows exemplary number of TCBs in dispatch queues, in accordance with certain embodiments. For example the primary dispatch queue Q0 502 of processing entity g0 312 may include two TCBs 602, 604 and as a result the number of TCBs in dispatch queue Q0 are assigned to be 2 (as shown via reference numeral 606). Similarly the primary dispatch queue Q1 504 of processing entity g1 314 may include three TCBs 608, 610, 612 and as a result the number of TCBs in dispatch queue Q1 are assigned to be 3 (as shown via reference numeral 614).

FIG. 7 illustrates a flowchart 700 that shows operations for task queuing, in accordance with certain embodiments. The operations shown in FIG. 7 may be performed by the TCB manager 134 that executes in the server 104.

Control starts at block 702 in which a TCB is made ready for being dispatched by a processing entity. Control proceeds to block 704, in which a determination is made as to whether the TCB was dispatched earlier 704. If so, ("Yes" branch 706), then the TCB is placed (at block 708) in the primary dispatch queue associated with the processing entity on which the TCB was last executed. As a result, cache invalidation traffic is reduced because the memory/cache for the processing entity may already have data remaining from the last execution of the TCB.

If at block 704 it is determined that the TCB was not dispatched earlier ("No" branch 710) then control proceeds to block 714 in which the TCB is placed in the primary dispatch queue associated with the processing entity that made the TCB ready for dispatching. As a result, the TCB may await execution preferentially in the primary dispatch queue of the processing entity that made the TCB ready for dispatching. Since the TCB has not been executed before, such a placement of the TCB may still be efficient as the data saved in memory/cache for making the TCB ready for dispatching may be used for executing the TCB later on. In alternative embodiments, in block 714, a dispatch queue is selected in a round-robin manner to place the TCB that is made ready.

FIG. 8 illustrates a flowchart 800 that shows operations for task dispatching by scanning the ordered list of dispatch queues (e.g., 520), in accordance with certain embodiments. The operations shown in FIG. 8 may be performed by the TCB manager 134 that executes in the server 104.

Control starts at block 802 in which it is determined that a processing entity (e.g., processing entity g0 312) is ready for executing a new TCB.

Control proceeds to block 804 in which a determination is made as to whether the primary dispatch queue in the ordered list of dispatch queues of the processing entity is empty. If not ("No" branch 806), then a TCB from the primary dispatch queue of the processing entity is dispatched and executed (at block 808). For example, in FIG. 5 which sets the threshold value of t0 to be 0 for primary dispatch queue Q0 (as shown via reference numerals 520, 522) as long as there is at least 1 or more TCBs in the primary dispatch queue Q0 a TCB is dispatched and executed from the dispatch queue Q0.

If at block 804 it is determined that the primary dispatch queue of the processing entity is not empty ("Yes" branch 810) then control proceeds to block 812 in which the ordered list of dispatch queues are scanned for the processing entity and a TCB is executed from the dispatch queue that meets a threshold criteria for the processing entity. For example, in FIG. 5, if there are no TCBs in the primary dispatch queue Q0 (as shown via reference numerals 520, and 522 which shows t0 to be 0), then the dispatch queue Q1 which has a threshold t1 of 4 (as shown via reference numeral 520, 522) is examined. Thus if the dispatch queue Q1 has more than 4 TCBs then a TCB from dispatch queue Q1 is taken for dispatch and execution. In such a manner, the entire list of dispatch queues in the ordered list of dispatch queues for the processing element is scanned and as soon as any dispatch queue has a number of TCBs that exceeds the threshold (indicated via t0, t1, t2 in reference numeral 520, 522) a TCB is taken for dispatch and execution from that dispatch queue. It should be noted in the ordered list of TCB dispatch queue, the preference is highest for the primary dispatch queue, then dispatch queues of processing elements in the same group, and then dispatch queues of processing elements in other groups. For example, FIG. 5 reference numeral 520 shows that after emptying the primary dispatch queue Q0, dispatch queues Q1, Q2, Q3 that are dispatch queues of the first group of processing entities 402 to which the processing entity g0 belongs are processed, and if the number of TCBs in these dispatch queues Q1, Q2, Q3 exceed the low threshold of 4, TCBs are taken out for processing from these dispatch queues Q1, Q2, Q3. Only when none of the dispatch queues Q1, Q2, Q3 have more than 4 waiting TCBs (as t1 is 4) are the dispatch queues Q4, Q5, Q6, Q7 of the second group 404 of processing entities examined. For the dispatch queues Q4, Q5, Q6, Q7 of the second group 404 of processing entities the threshold t2 is set to be considerably higher than t1 and is set to 16. Hence, only if there are more than 16 TCBs waiting in dispatch queues of the second group are such TCBs eligible for dispatch to and processing by the processing entity g0. As the TCBs are dispatched for execution, the lastrun value for a TCB is set to equal the processing entity that executes the TCB (at block 614), where the lastrun value for the TCB stores the identity of the processing entity that has last executed the TCB.

In FIGS. 5-8 the threshold t1 should be a small value but large enough so TCBs do not move between queues when there is a small amount of work in the system. For example, a value of 4 or 8 may be an appropriate value for t1. The more hierarchies of processing entity groups that are there, the higher the threshold value should be, i.e., t2 should be much bigger than t1 and if in certain embodiments there is a threshold t3, then t3 should be much greater than t2.

Figure 9:
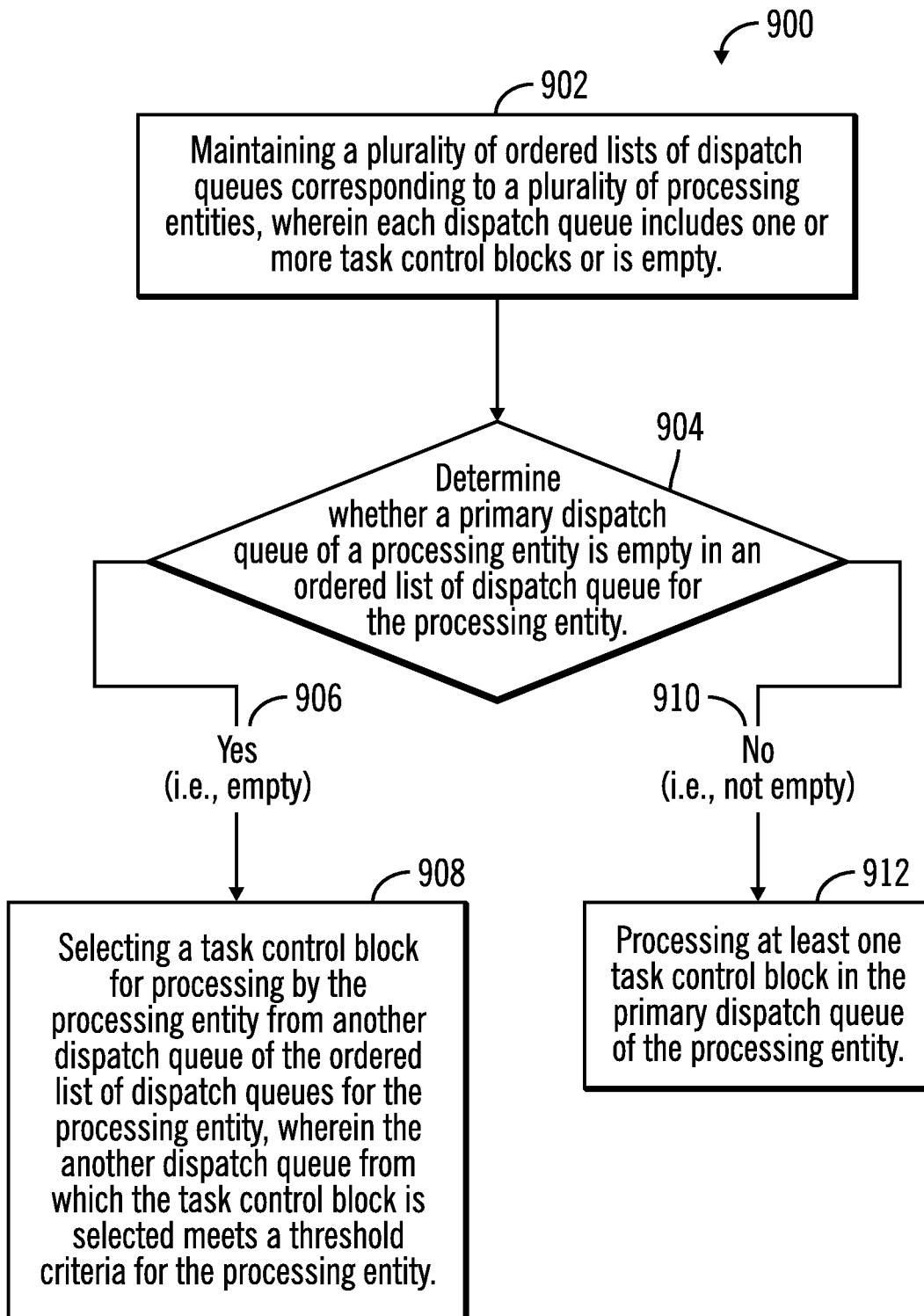
FIG. 9 illustrates a flowchart that shows operations for task dispatching from ordered lists of dispatch queues, in accordance with certain embodiments.

FIG. 9 illustrates a flowchart 900 that shows operations for task dispatching from ordered lists of dispatch queues, in accordance with certain embodiments. The operations shown in FIG. 9 may be performed by the TCB manager 134 that executes in the server 104.

Control starts at block 902 in which a plurality of ordered lists of dispatch queues corresponding to a plurality of processing entities are maintained, wherein each dispatch queue includes one or more task control blocks or is empty (i.e., each dispatch queue is either empty or includes one or more task control blocks). A determination is made (at block 904) as to whether a primary dispatch queue of a processing entity is empty in an ordered list of dispatch queue for the processing entity. In response to determining that the primary dispatch queue of the processing entity is empty ("Yes" branch 906) control proceeds to block 908 in which a task control block is selected for processing by the processing entity from another dispatch queue of the ordered list of dispatch queues for the processing entity, wherein the another dispatch queue from which the task control block is selected meets a threshold criteria for the processing entity. As a result, tasks are dispatched to improve data locality and reduce cache invalidation traffic. Additionally, many processing entities are used when there are many tasks to be executed. Furthermore, processing entities are utilized in a balanced manner for executing tasks.

In response to determining that the primary dispatch queue of the processing entity is not empty ("No" branch 910) control proceeds to block 912 in which at least one task control block in the primary dispatch queue of the processing entity is processed. As a result, task control blocks on the primary dispatch queue of the processing entity have precedence for execution over task control blocks on other dispatch queues of the processing entity.

Therefore FIGS. 1-9 illustrate certain embodiments in which TCBs dispatches are balanced across CPU, and re-dispatches are on the same group of CPUs to maximize data locality and minimize cache invalidation traffic.

Grouping of Tasks for Distribution Among Processing Entities

A plurality of tasks may run on a system such as a storage server. Certain mechanisms may require a lock to serialize access to data structures and the more processing entities that are there to run the tasks, the more the likelihood of lock contention, and this may result in a performance slowdown. Certain embodiments categorize the tasks based on the type of work performed by the tasks, such as task categories that include tasks for performing copy services functions, cache management functions, disks management functions, etc. Tasks of the same category are likely to reserve the same locks and may only scale up to a certain number of processing entities, and then a slowdown may occur when running on more processing entities, In certain embodiments, mechanisms are provided to identify up to how many processing entities can run tasks of a particular category effectively, via code inspection, profiling, or experimentation and by varying the number of processing entities running tasks in that category.

Certain embodiments describe a TCB dispatch scheme that allows TCBs of defined categories to be dispatched only to a certain set of processing entities to allow those TCBs to run effectively. Definitions are provided for different categories of TCBs that has limits on how many and which processing entities can run such TCBs. These TCBs are tagged with a category type and the category type is used during dispatch to determine the processing entity to which a TCB is to be dispatched.

Figure 10:
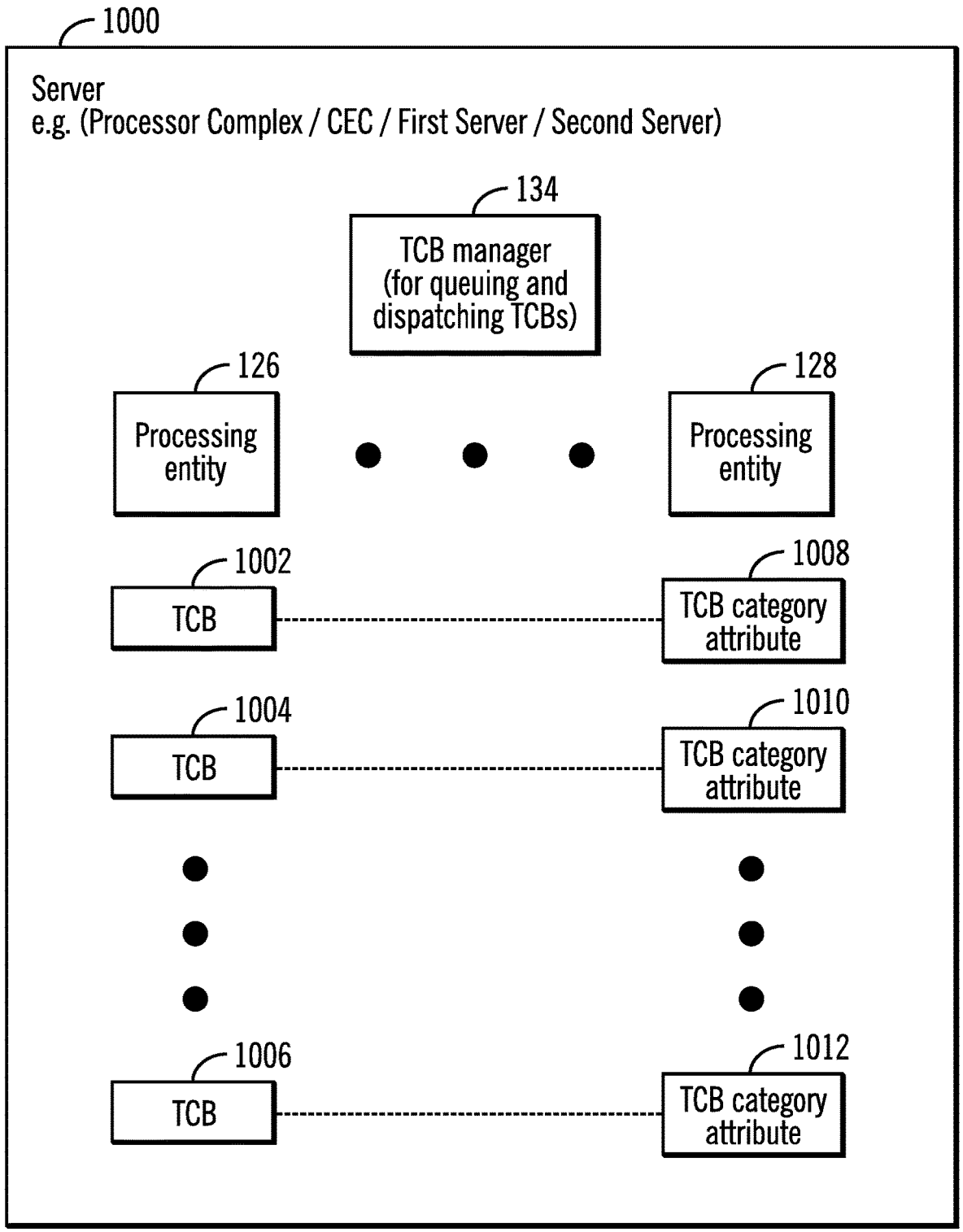
FIG. 10 illustrates a block diagram of a server in which grouping of tasks for distribution among processing entities is performed, in accordance with certain embodiments.

FIG. 10 illustrates a block diagram of a server 1000 in which grouping of tasks for distribution among a plurality of processing entities 126, 128 is performed, in accordance with certain embodiments. The server 104 may correspond to the first or the second server shown in the storage system 102 of FIG. 1.

The server 100 includes the TCB manager 134 and a plurality of processing entities 126, 120. A plurality of TCBs 1002, 1004, 1006 may be generated in the server 1000 for performing various tasks, and corresponding TCB category attributes 1008, 1010, 1012 are maintained in the server 1000. The TCB category attributes 1008, 1010, 1012 are data structures that include metadata (i.e., added information) about the TCBs 1002, 1004, 1006.

Figure 11:
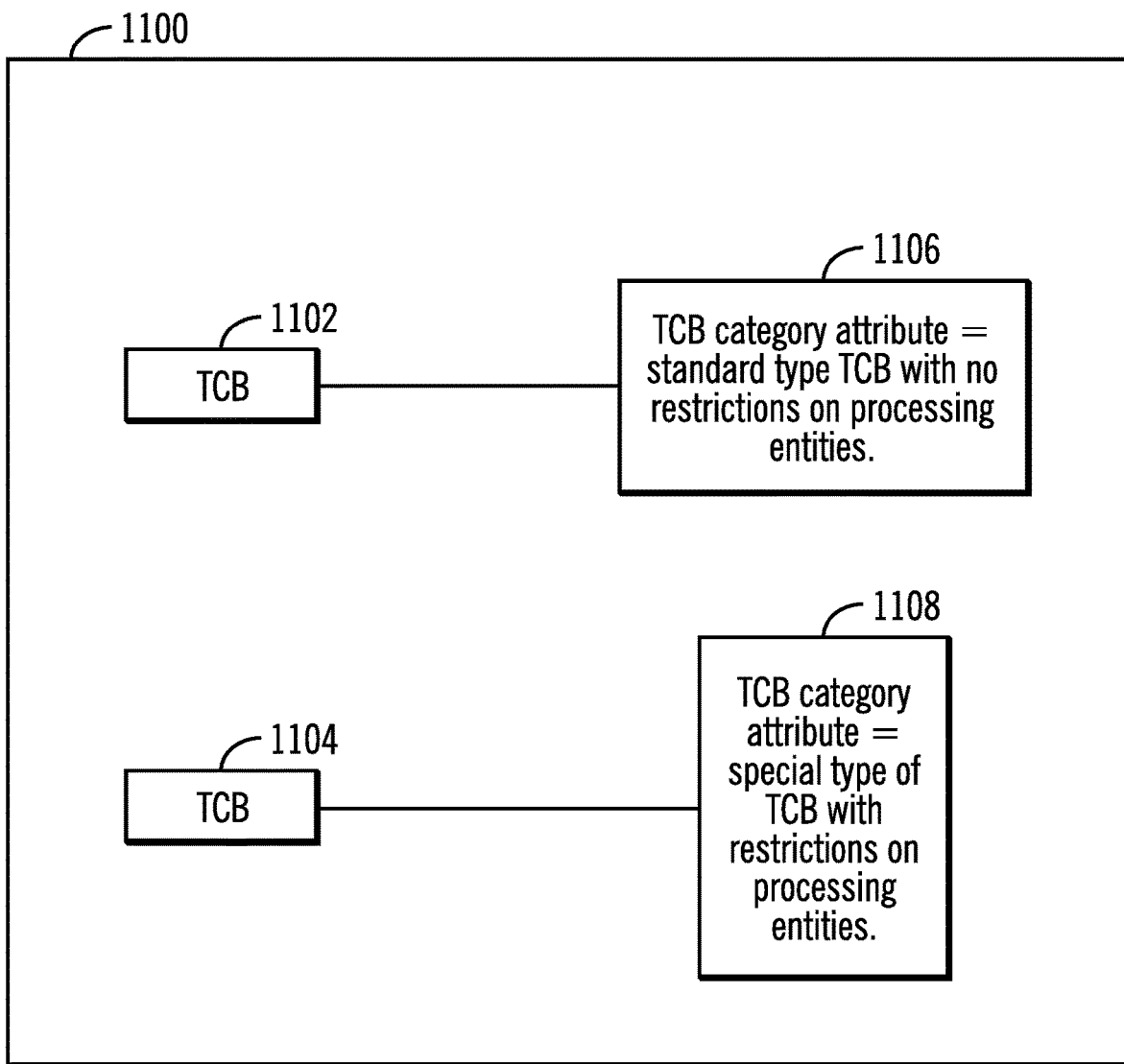
FIG. 11 illustrates a block diagram in which TCB category attributes are associated with TCBs, in accordance with certain embodiments.

FIG. 11 illustrates a block diagram 1100 in which TCB category attributes are associated with TCBs, in accordance with certain embodiments. In FIG. 11, TCB 1102 has a TCB category attribute 1106 that indicates that TCB 1102 is a standard (i.e., regular or normal) type of TCB in which no restrictions are placed that restrict the processing entities that can be used to execute the TCB 1102.

In FIG. 11, TCB 1104 has a TCB category attribute 1108 that indicates that TCB 1104 is a special type of TCB in which restrictions are placed to limit the processing entities that can be used to execute the TCB 1104.

Figure 12:
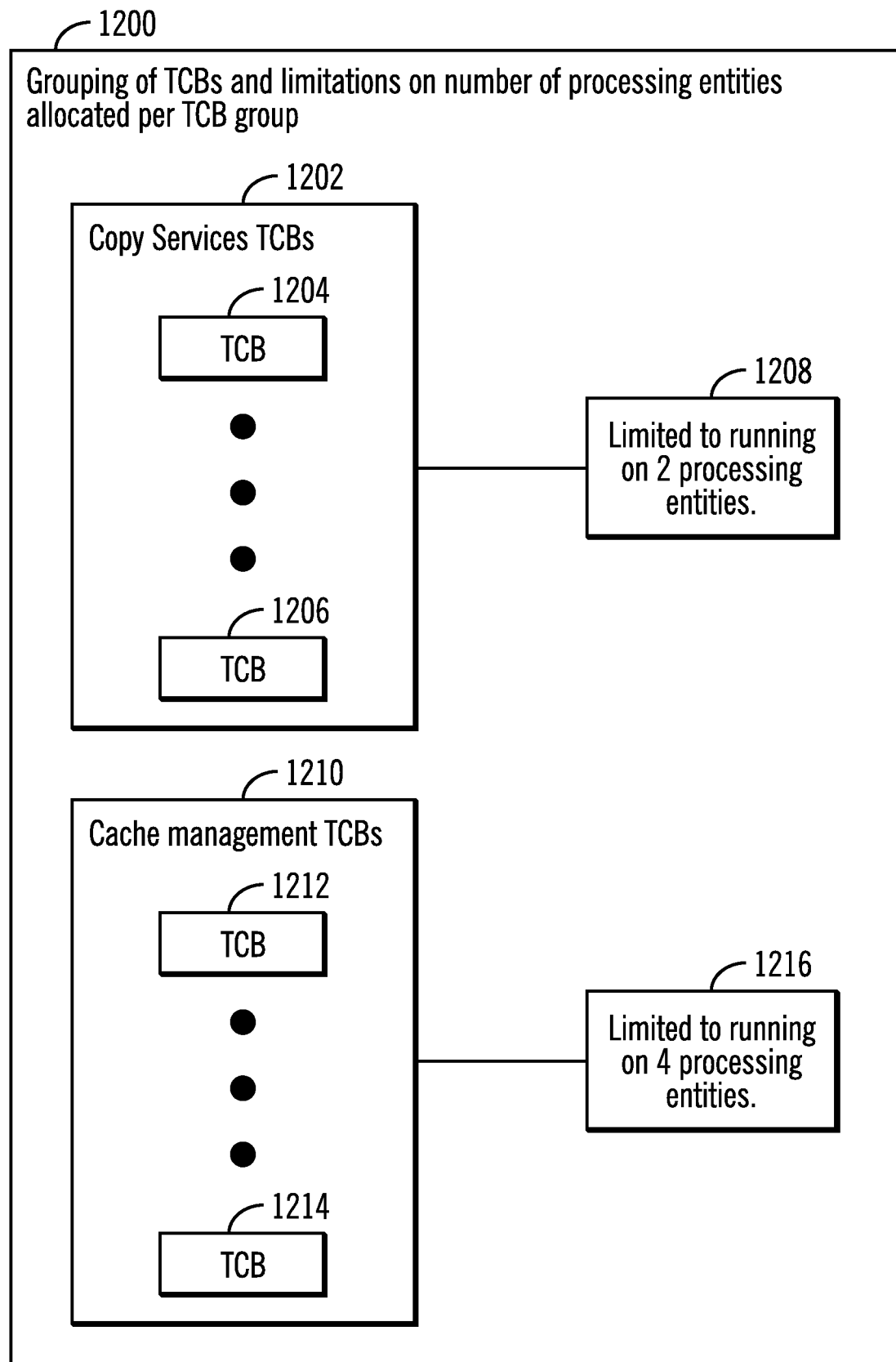
FIG. 12 illustrates a block diagram in which TCBs are grouped into TCB groups and the TCBs of each TCB group are restricted to a subset of processing entities, in accordance with certain embodiments.

FIG. 12 illustrates a block diagram 1200 in which TCBs are grouped into TCB groups and the TCBs of each TCB group are restricted to a subset of processing entities, in accordance with certain embodiments.

In FIG. 12 a group of TCBs referred to a copy services TCBs 1202 include a plurality of TCBs 1204, 1206 that are for performing copy services, such as peer to peer remote copy, synchronous copy, asynchronous copy, etc. In certain embodiments, the copy services TCBs are limited to running on 2 processing entities as shown via reference numeral 1208. In other embodiments the copy services TCBs are limited to running on some other number of processing entities such as on 100 processing entities.

In FIG. 12 a group of TCB's referred to a cache management TCBs 1210 include a plurality of TCBs 1212, 1214 that are for performing cache management services on the cache that may be maintained in the server 1000. In certain embodiments, the cache management TCBs are limited to running on 4 processing entities as shown via reference numeral 1216. In other embodiments the copy services TCBs are limited to running on some other number of processing entities such as on 150 processing entities.

Figure 13:
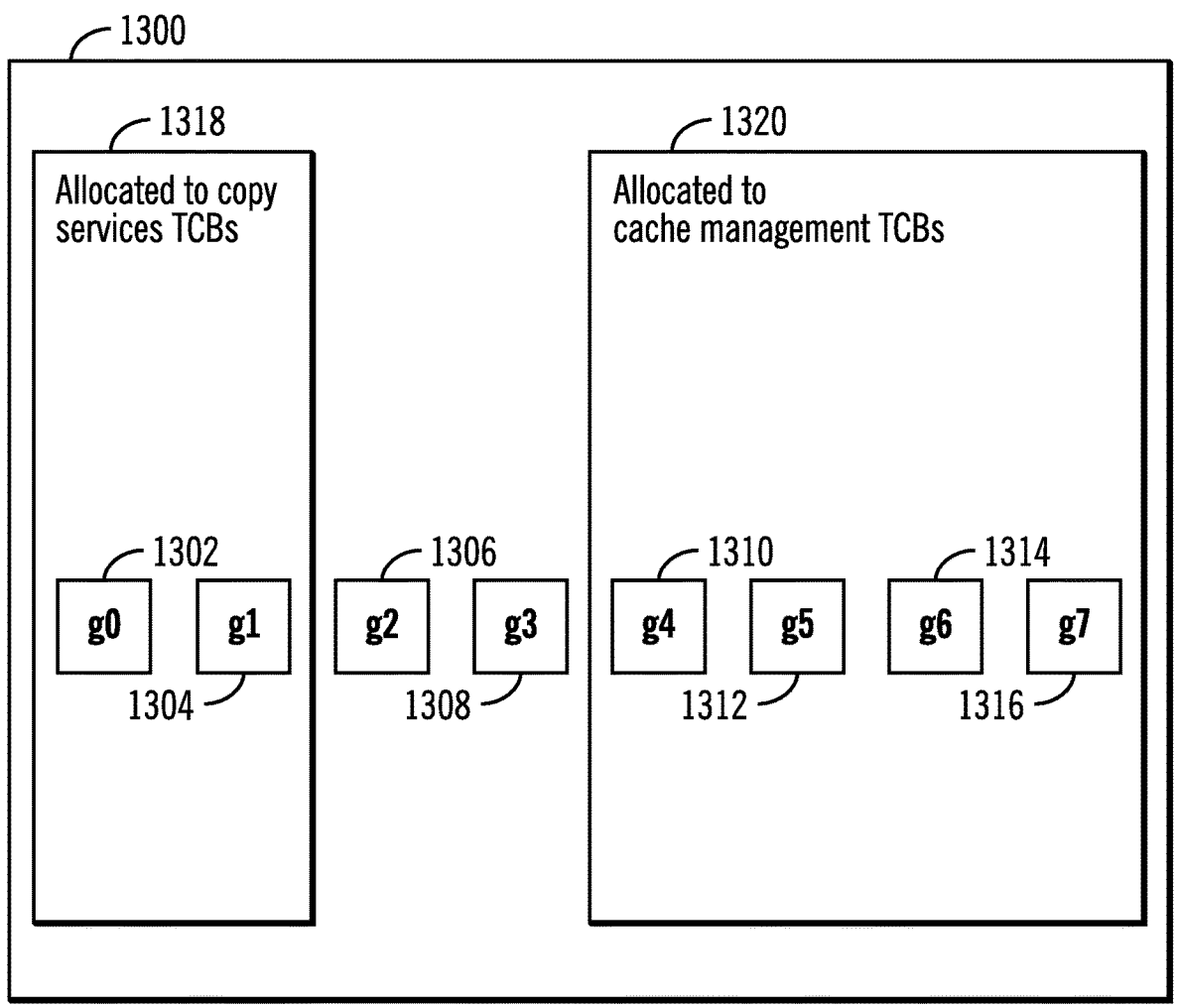
FIG. 13 illustrates a block diagram in which different processing entities are allocated to different groups of TCBs, in accordance with certain embodiments.

FIG. 13 illustrates a block diagram 1300 in which different processing entities are allocated to different groups of TCBs, in accordance with certain embodiments. In FIG. 13, processing entities g0, g1 1302, 1304 are allocated to copy services TCBs (reference numeral 1318), and processing entities g4, g5, g6, g7 1310, 1312, 1314, 1316 are allocated to cache management TCBs (reference numeral 1320). The processing entities g2, g3 1306, 1306 are free to be allocated to any TCB.

Figure 14:
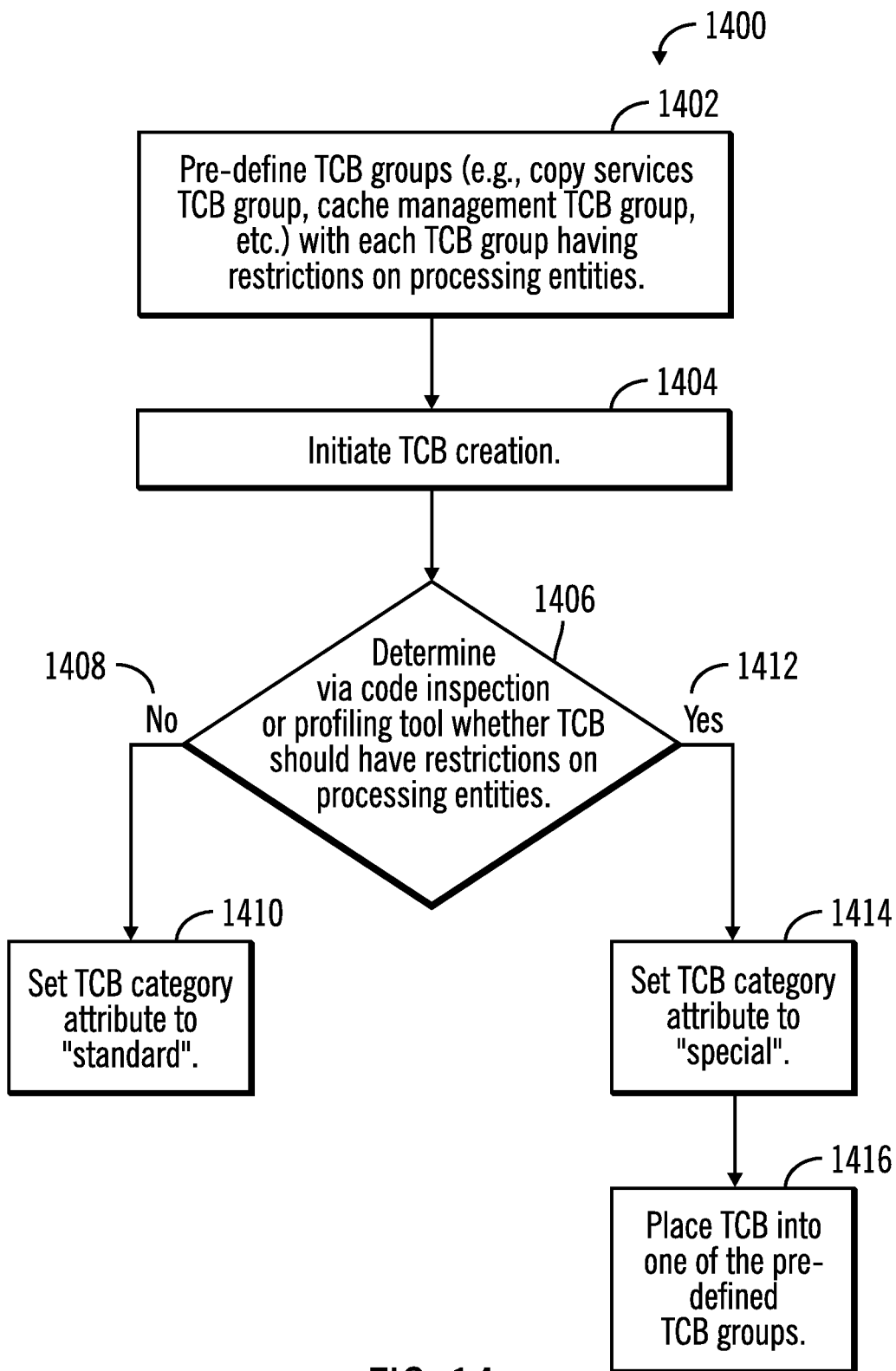
FIG. 14 illustrates a flowchart for setting TCB category attributes and for placing TCBs in predefined groups, in accordance with certain embodiments.

FIG. 14 illustrates a flowchart 1400 for setting TCB category attributes and for placing TCBs in predefined groups, in accordance with certain embodiments. The operations shown in FIG. 14 may be performed by the TCB manager 134 that executes in the server 1000.

Control starts at block 1402 in which TCB manager 134 pre-defines TCB groups (e.g., copy service TCB group, cache management TCB group, etc.) with each TCB group having restrictions on processing entities.

Control proceeds to block 1404 in which a TCB creation is initiated. Code inspection or profiling tool is used to determine (at block 1406) whether the TCB should have restrictions on processing entities. If no restrictions are to be placed on processing entities ("No" branch 1408) then control proceeds to block 1410 in which the TCB category attribute corresponding to the TCB is set to "standard" (at block 1410).

If at block 1406 it is determined that restrictions are to be placed on processing entities ("Yes" branch 1412) then control proceeds to block 1414 in which the TCB category attribute is set to "special" (at block 1414). Control proceeds to block 1416 in which the TCB is placed in one of the pre-defined groups of TCBs.

Figure 15:
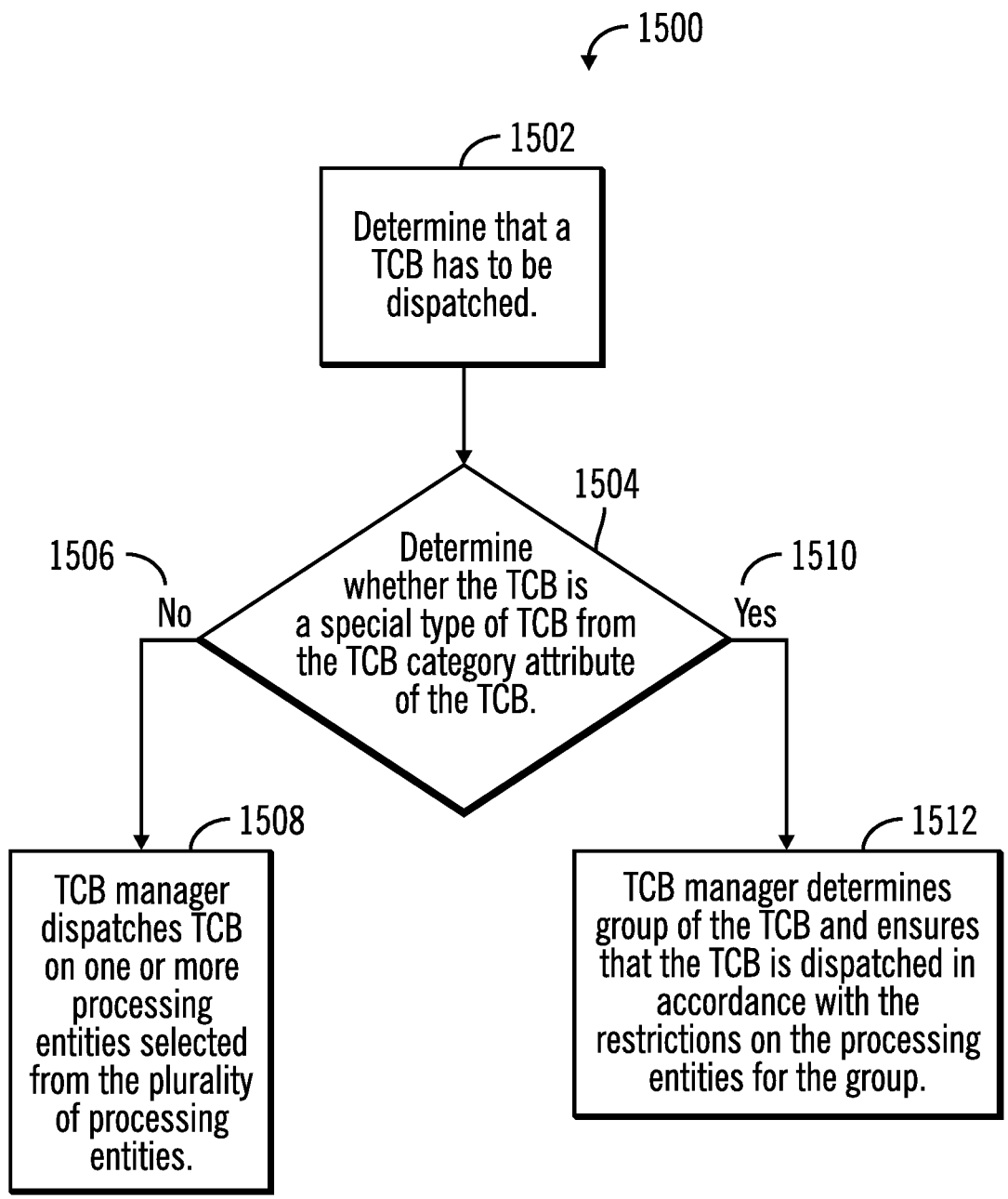
FIG. 15 illustrates a flowchart for processing different types of TCBs, in accordance with certain embodiments.

FIG. 15 illustrates a flowchart 1500 for processing different types of TCBs, in accordance with certain embodiments. The operations shown in FIG. 15 may be performed by the TCB manager 134 that executes in the server 1000.

Control starts at block 1502 in which a determination is made that a TCB has to be dispatched for execution. The TCB manager 134 determines (at block 1504) whether the TCB is a special type of TCB from the TCB category attribute of the TCB.

If the TCB is not a special type of TCB ("No" branch 1506), then control proceeds to block 1508 in which the TCB manager 134 dispatches the TCB for execution on one or more processing entities selected from the plurality of processing entities of the server 1000 (at block 1508).

If the TCB is a special type of TCB ("Yes" branch 1510), then control proceeds to block 1512 in which the TCB manager 134 determines the group of the TCB and ensures that the TCB is dispatched in accordance with the restrictions on the processing entities for the group (at block 1512). For example, if the TCB is a cache management TCB then the TCB is dispatched to one or more of the processing entities g4, g5, g6, g7 1310, 1312, 1314, 1316 as shown in FIG. 13.

Figure 16:
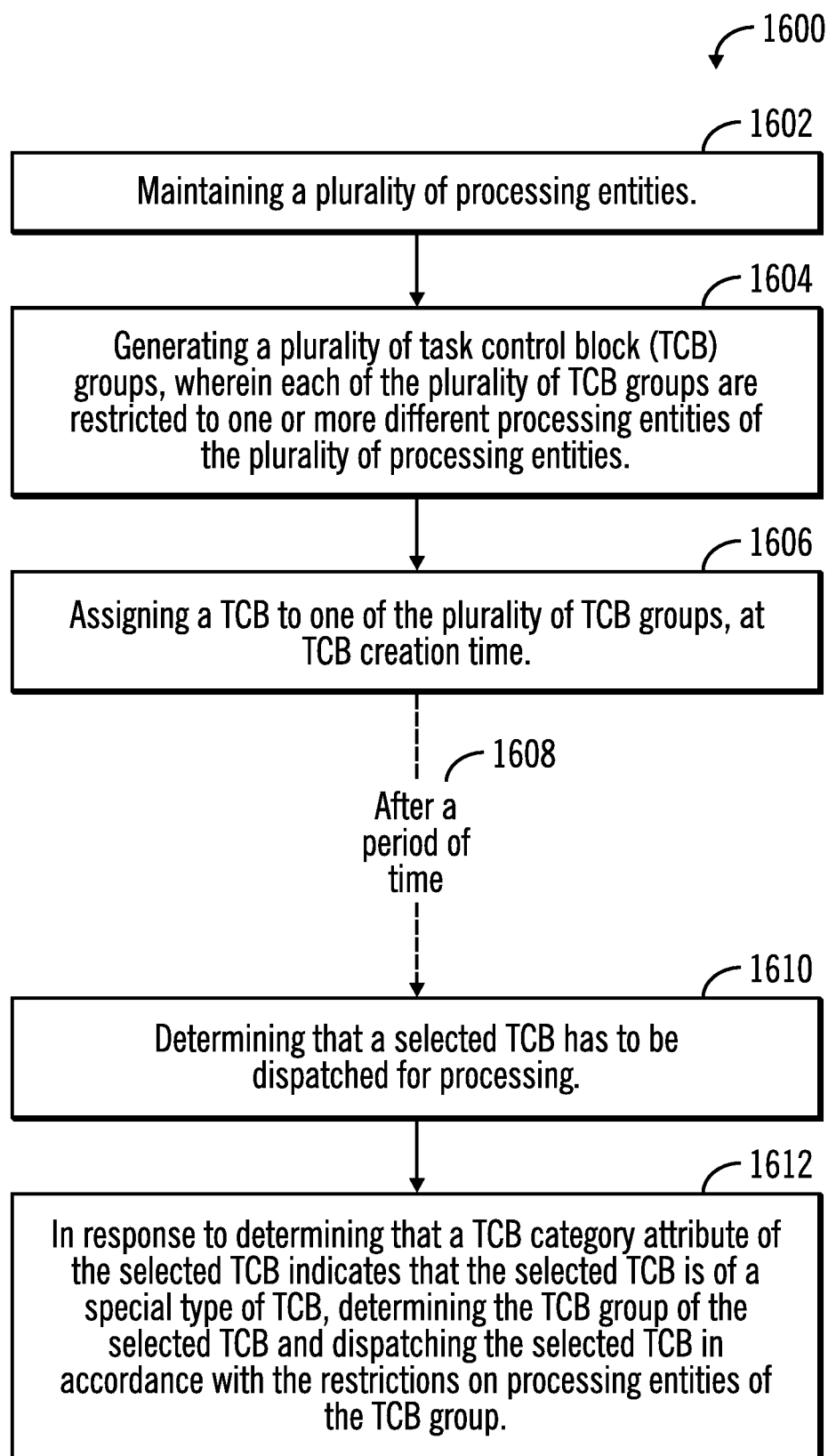
FIG. 16 illustrates a flowchart for grouping of TCBs and distributing the TCBs among processing entities for balancing workload on processing units, in accordance with certain embodiments.

FIG. 16 illustrates a flowchart 1600 for grouping of TCBs and distributing the TCBs among processing entities for balancing workload on processing units, in accordance with certain embodiments. The operations shown in FIG. 16 may be performed by the TCB manager 134 that executes in the server 1000.

Control starts at block 1602 in which the TCB manager 134 maintains a plurality of processing entities. The TCB manager 134 generates (at block 1604) a plurality of task control block (TCB) groups, where each of the plurality of TCB groups are restricted to one or more different processing entities of the plurality of processing entities. Control proceeds to block 1606 in which the TCB manager 134 assigns a TCB to one of the plurality of TCB groups, at TCB creation time.

After an interval of time (shown via reference numeral 1608), the TCB manager 134 determines that a selected TCB has to be dispatched for processing. In response to determining (at block 1612) that a TCB category attribute of the selected TCB indicates that the selected TCB is of the special type of TCB, the TCB manager 134 determines the TCB group of the selected TCB and dispatches the selected TCB in accordance with the restrictions on processing entities of the TCB group.

Therefore, at least FIGS. 10-16 describes certain embodiments in which TCBs are grouped into various groups, wherein restrictions are placed on which processing entities may be allocated to which group. As a result, the different types of TCBs are able to share the processing entities in an equitable manner.

Integrating Grouping of Tasks with Task Queues

FIGS. 1-9 described embodiments that used ordered lists of dispatch queues for balancing the processing of TCBs across a plurality of processing entities. FIGS. 10-16 described embodiments in which TCBs were grouped into different groups and each group was restricted to certain subsets of processing entities for processing. In certain embodiments, the grouping of TCBs may be used along with the ordered lists of dispatch queues for the balanced utilization of processing entities in a server.

Figure 17:
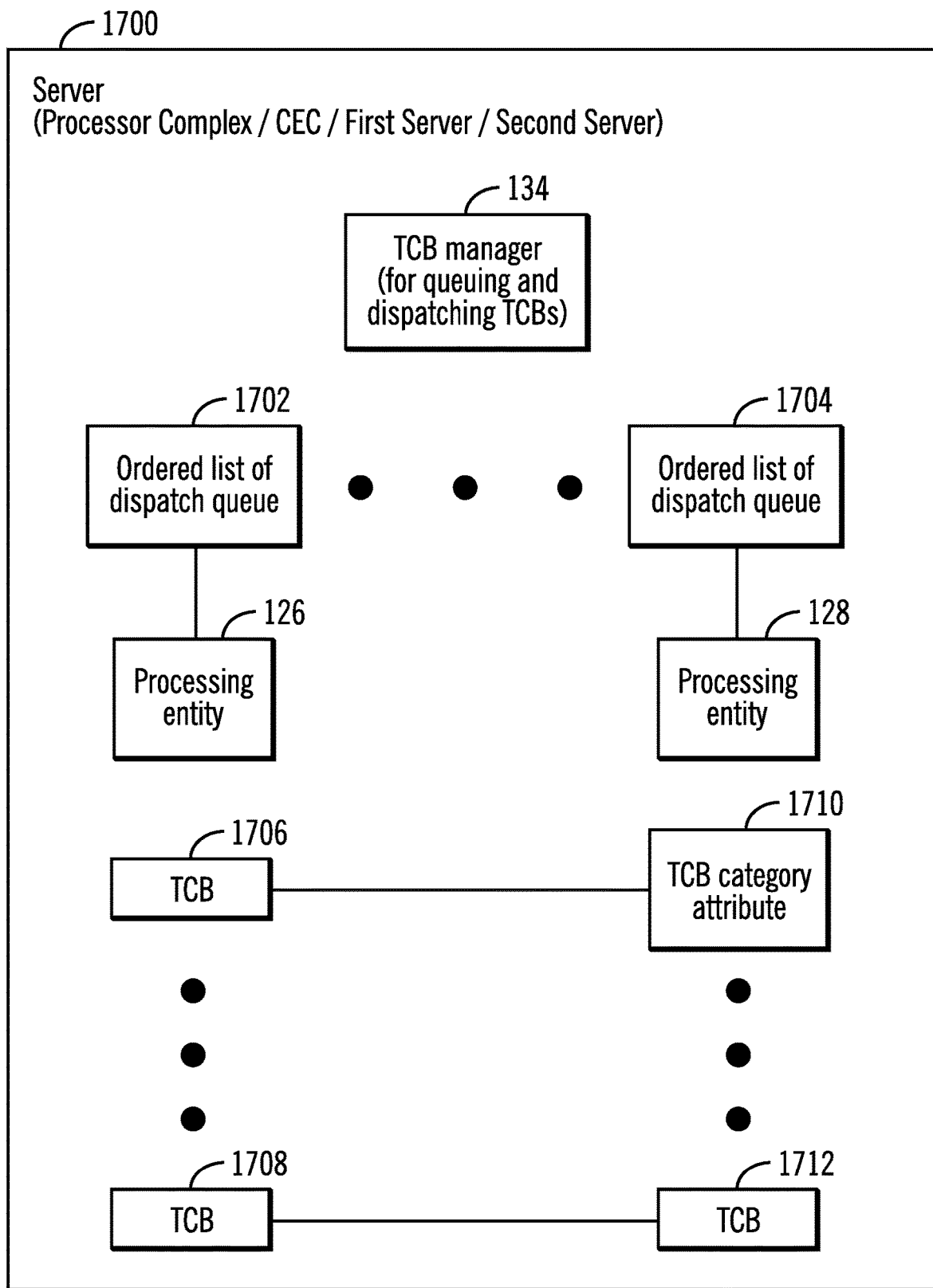
FIG. 17 illustrates a block diagram of a server that integrates the grouping for tasks with ordered lists of dispatch queues, in accordance with certain embodiments.

FIG. 17 illustrates a block diagram of a server 1700 that integrates the grouping for tasks with ordered lists of dispatch queues, in accordance with certain embodiments.

The server 1700 may correspond to the first server 104 or the second server 106 of the storage system 102. A plurality of processing entities 126, 128 may have corresponding ordered lists of dispatch queues 1702, 1704 as described earlier in FIGS. 1-9.

The TCB manager 134 may also manage a plurality of TCBs 1706, 1708 generated in the server 1700 over a period of time, where each of the TCBs 1706, 1708 have TCB category attributes 1710, 1712 associated with them.

In certain embodiments shown in FIG. 1 the TCB manager 134 performs both the grouping of tasks described in FIGS. 10-16 and the management of the ordered lists of dispatch queues described in FIGS. 1-9.

Figure 18:
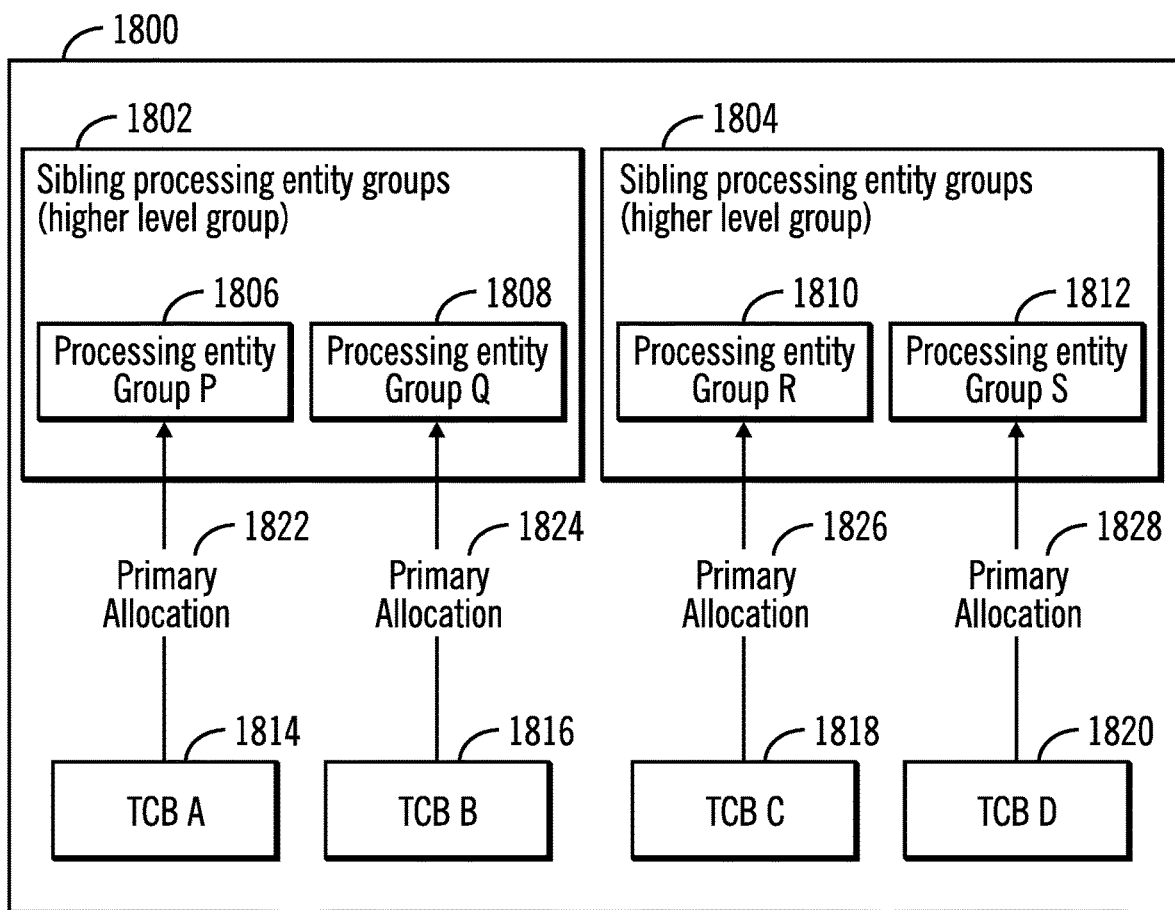
FIG. 18 illustrates a block diagram that shows how each TCB has a primary processing entity group for allocation, in accordance with certain embodiments.

FIG. 18 illustrates a block diagram 1800 that shows how each TCB has a primary processing entity group for allocation, in accordance with certain embodiments.

Two sibling processor entity groups 1802 and 1804 are shown. Sibling processor entity groups 1802, 1804 may include processing entities or processing entity groups from the same module of the server 1700. For example, processing entity groups P, Q (shown via reference numerals 1806, 1808) are in higher level processing entity group 1802, and processing entity groups R, S (shown via reference numerals 1810, 1812) are in higher level processing entity group 1804, where the higher level processing entity groups 1802, 1804 have processing entities from the same module (or chip or some other unit) and are referred to as sibling processing entity groups of each other.

In certain embodiments, the TCB manager 134 allocates for TCB A 1814, TCB B 1816, TCB C 1818, and TCB D 1820, the processing entity group P 1806, the processing entity group Q 1808, the processing entity group R 1810, and the processing entity group S 1812 respectively as shown via reference numerals 1822, 1824, 1826, 1828.

Figure 19:
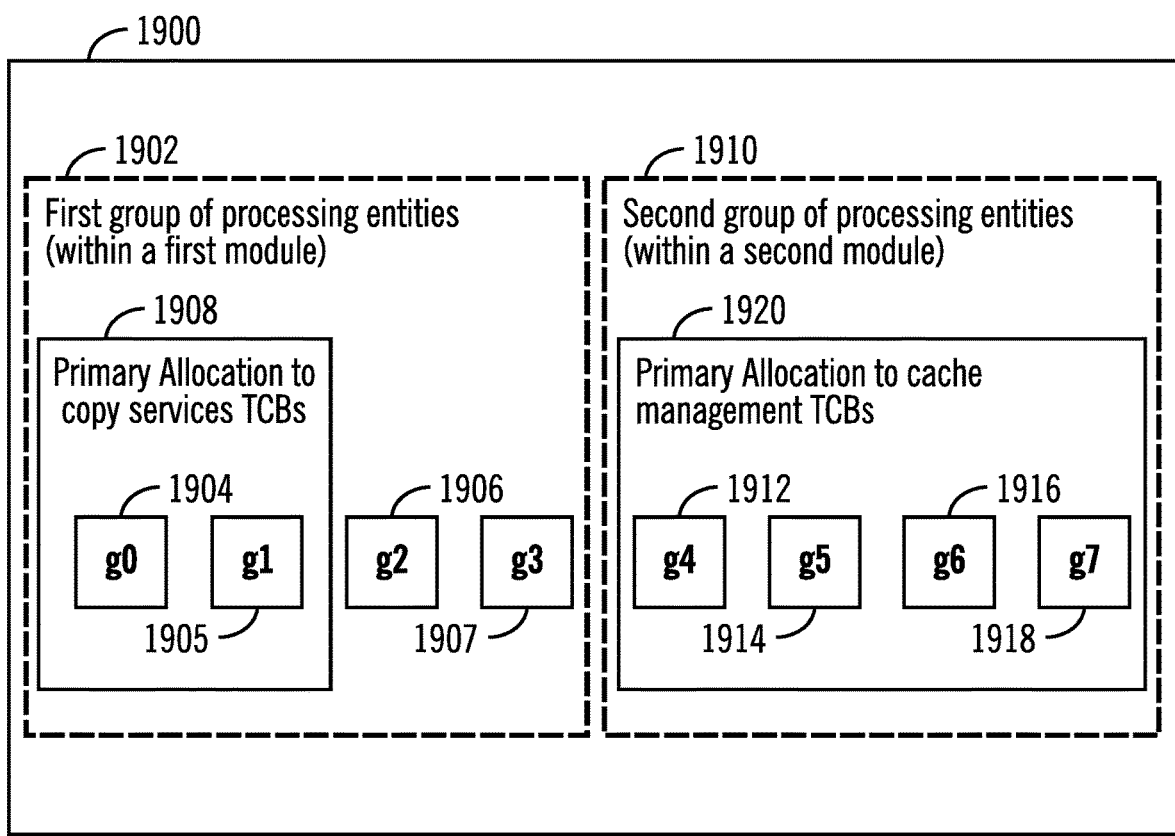
FIG. 19 illustrates a block diagram that shows exemplary allocation of processing entity or processing entity groups to different groups of tasks, in accordance with certain embodiments.

FIG. 19 illustrates a block diagram 1900 that shows exemplary allocation of processing entity or processing entity groups to different groups of tasks, in accordance with certain embodiments. In FIG. 19, a first group of processing entities 1904, 1905, 1906, 1907 are within a first module (as shown via reference numeral 1902), and a second group of processing entities 1912, 1914, 1916, 1918 are in a second module (as shown via reference numeral 1910). The processing entities 1904, 1905 are configured to have primary allocation for copy services TCBs (as shown via reference numeral 1908) and the processing entities 1912, 1914, 1916, 1918 are configured to have primary allocation for cache management TCBs (as shown via reference numerals 1920). Therefore, primary allocation of a TCB within a TCB group is attempted from the same module.

Figure 20:
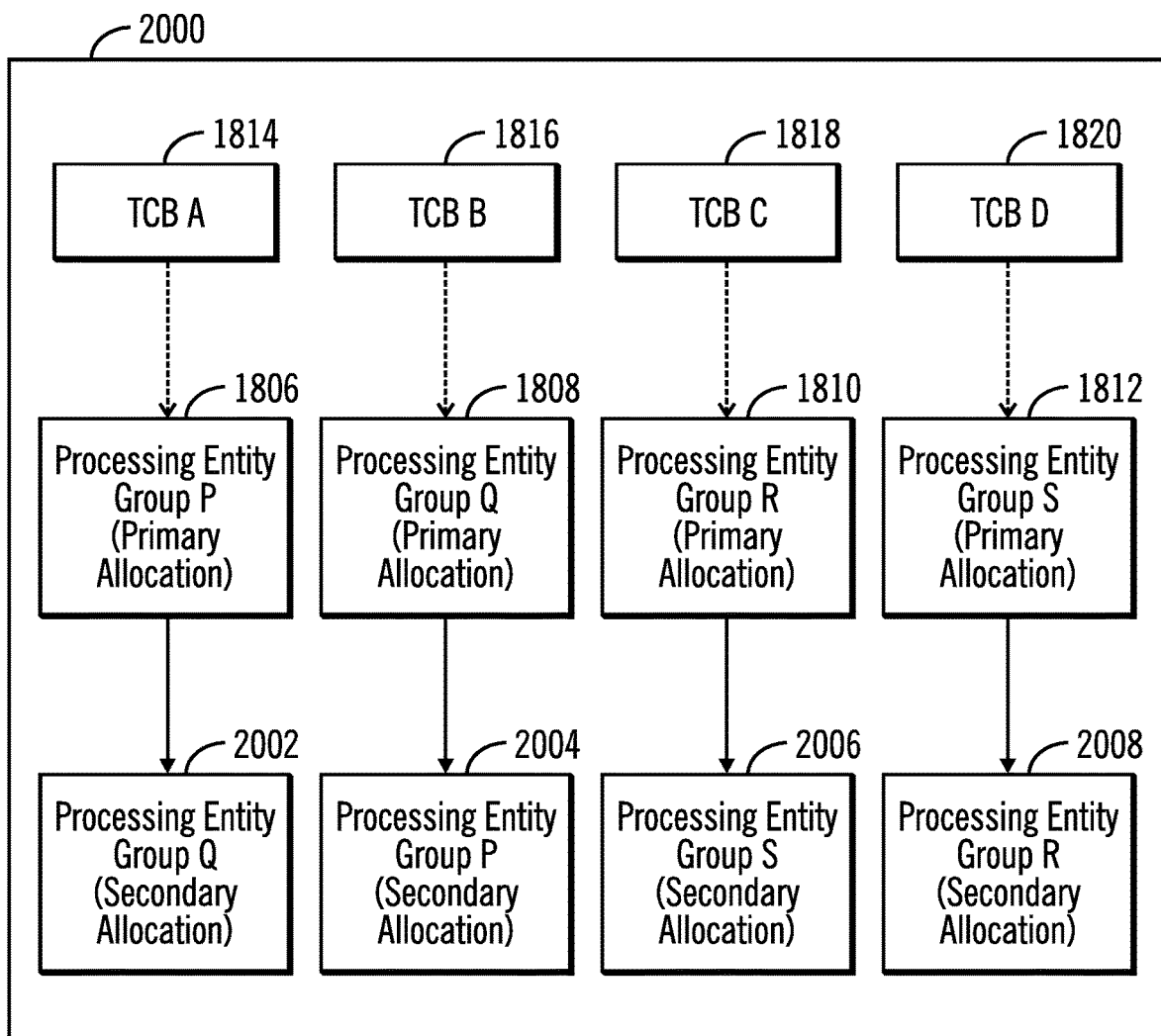
FIG. 20 illustrates a block diagram that shows how each TCB has a secondary processing entity group for allocation, in accordance with certain embodiments.

FIG. 20 illustrates a block diagram 2000 that shows how each TCB has a secondary processing entity group for allocation, in accordance with certain embodiments. In FIG. 20, the TCBs A, B, C, D (reference numerals 1814, 1816, 1818, 1820) are configured to have primary allocations to processing entities (or entity groups) P, Q, R, S (reference numerals 1806, 1808, 1810, 1812) respectively as shown earlier in FIG. 18. In certain embodiments, in addition to the primary allocation, the TCBs are also configured to have a secondary allocation of processing entities, where the secondary allocation is a sibling processing entity (or processing entity group) of the primary allocation. For example, FIG. 20 shows processing entity groups Q, P, S, R (reference numerals 2002, 2004, 2006, 2008) being allocated as secondary allocation to TCB A, B, C, D (reference numerals 1814, 1816, 1818, 1820) respectively, where processing entities P and Q are sibling processing entities from one module, and processing entities R and S are sibling processing entities from another module.

Figure 21:
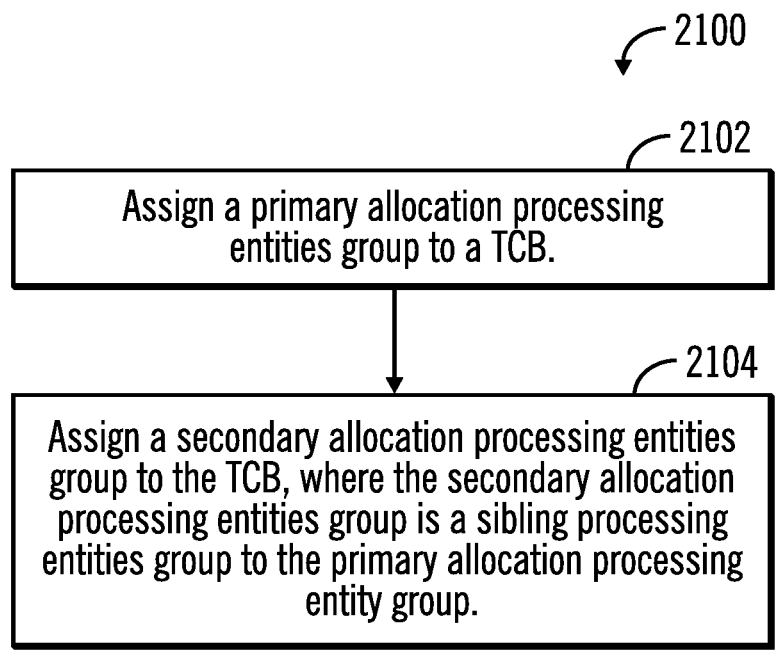
FIG. 21 illustrates a flowchart for assigning a primary and a secondary allocation of processing entities to a TCB, in accordance with certain embodiments.

FIG. 21 illustrates a flowchart 2100 for assigning a primary and a secondary allocation of processing entities to a TCB, in accordance with certain embodiments. The operations shown in FIG. 21 may be performed by the TCB manager 134 that executes in the server 1700.

Control starts at block 2102 in which the TCB manager 134 assigns a primary allocation processing entities group to a TCB, and then control proceeds to block 2104 in which the TCB manager 134 assigns a secondary allocation processing entities group to the TCB, where the secondary allocation processing entities group is a sibling processing entities group to the primary allocation processing entity group.

Figure 22:
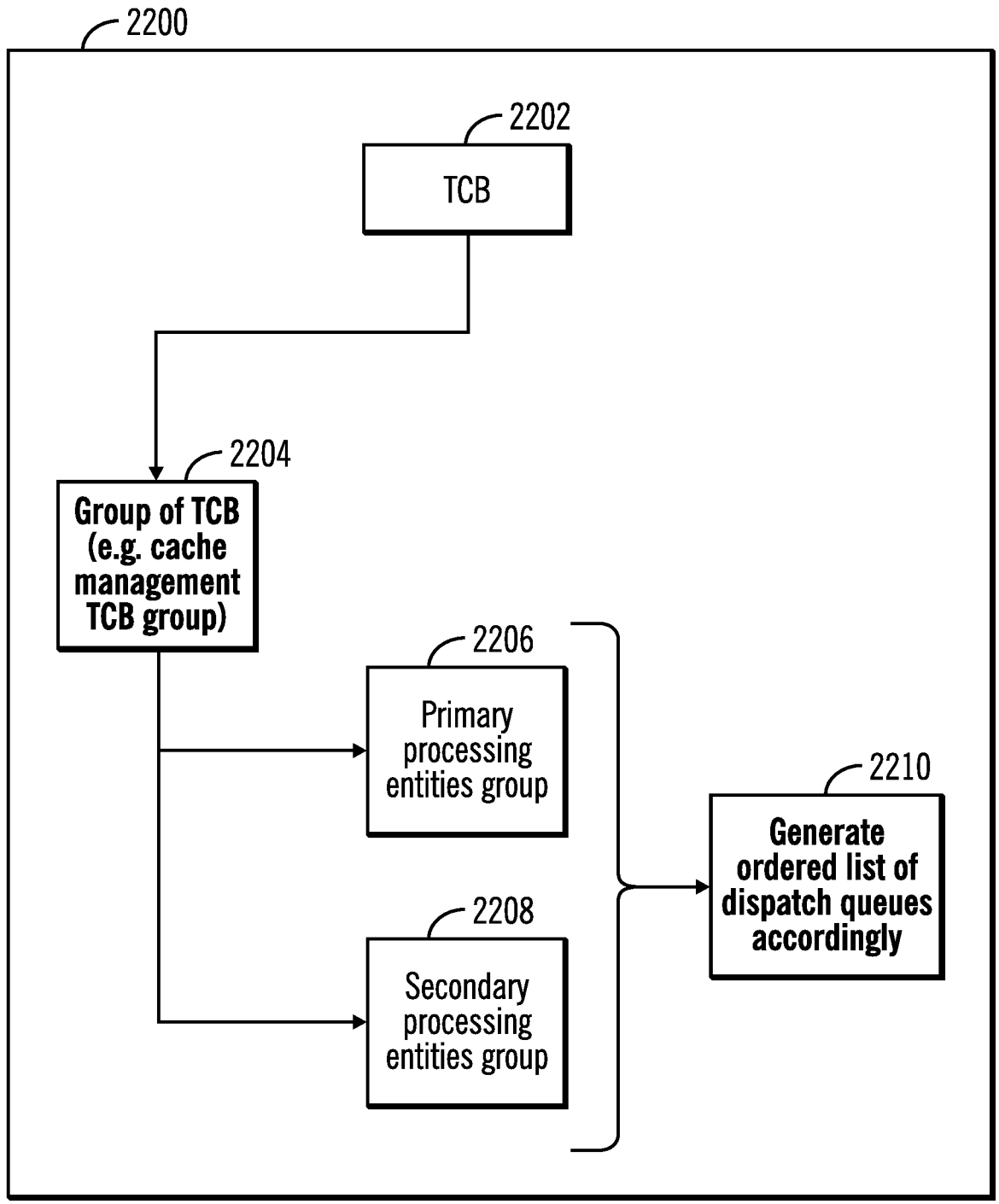
FIG. 22 illustrates a block diagram that shows generation of ordered lists of dispatch queues from groups of TCBs, in accordance with certain embodiments.

FIG. 22 illustrates a block diagram 2200 that shows generation of ordered lists of dispatch queues from groups on TCBs, in accordance with certain embodiments. The operations shown in FIG. 22 may be performed by the TCB manager 134 that executes in the server 1700.

A TCB 2202 is placed in a group of TCBs (e.g. into a cache management TCB group) 2204. Then the TCBs in the group are assigned a primary processing entities group 2206 and a secondary processing entities group 2208. Ordered lists of dispatched queues are generated accordingly (as shown via reference numerals 2210).

Figure 23:
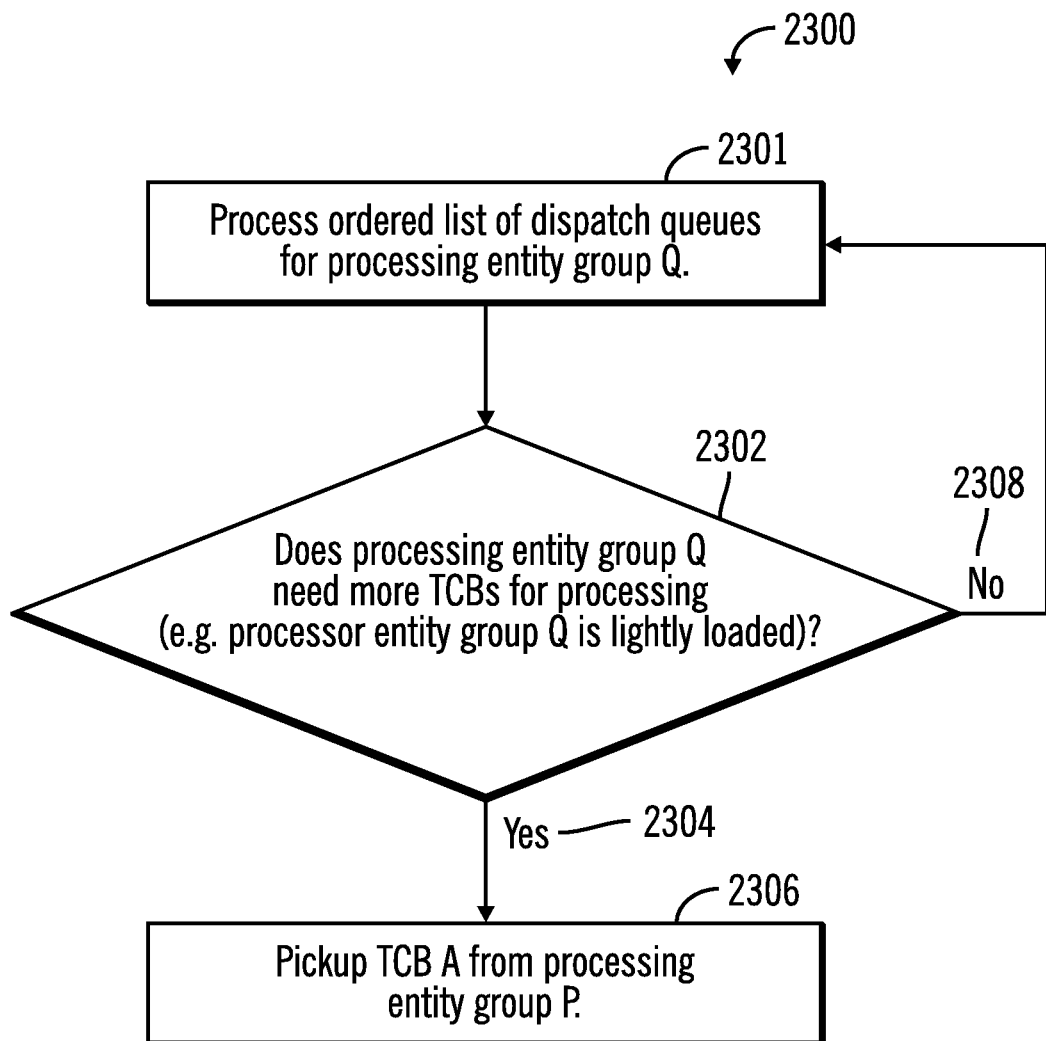
FIG. 23 is a flowchart that shows how a processing entity or processing entity group picks up a TCB for processing, in accordance with certain embodiments.

FIG. 23 is a flowchart 2300 that shows how a processing entity or processing entity group picks up a TCB for processing, in accordance with certain embodiments. The operations shown in FIG. 23 may be performed by the TCB manager 134 that executes in the server 1700.

Control starts at block 2301 in which the TCB manager 134 processes an ordered list of dispatch queues for processing entity group Q. Control proceeds to block 2302 in which a determination is made as to whether processing entity group Q needs more TCBs for processing, as processing entity group Q is lightly loaded. If so ("Yes" branch 2304) then control proceeds to block 2306 then the TCB manager 134 picks up TCB A from processing entity group P (P is primary allocation of TCB A 1814 as shown in FIG. 20) and places the TCB A in the queue for processing entity group Q (Q is secondary allocation of TCB A 1814 as shown in FIG. 20). If not ("No" branch 2308) control returns to block 2301.

Figure 24:
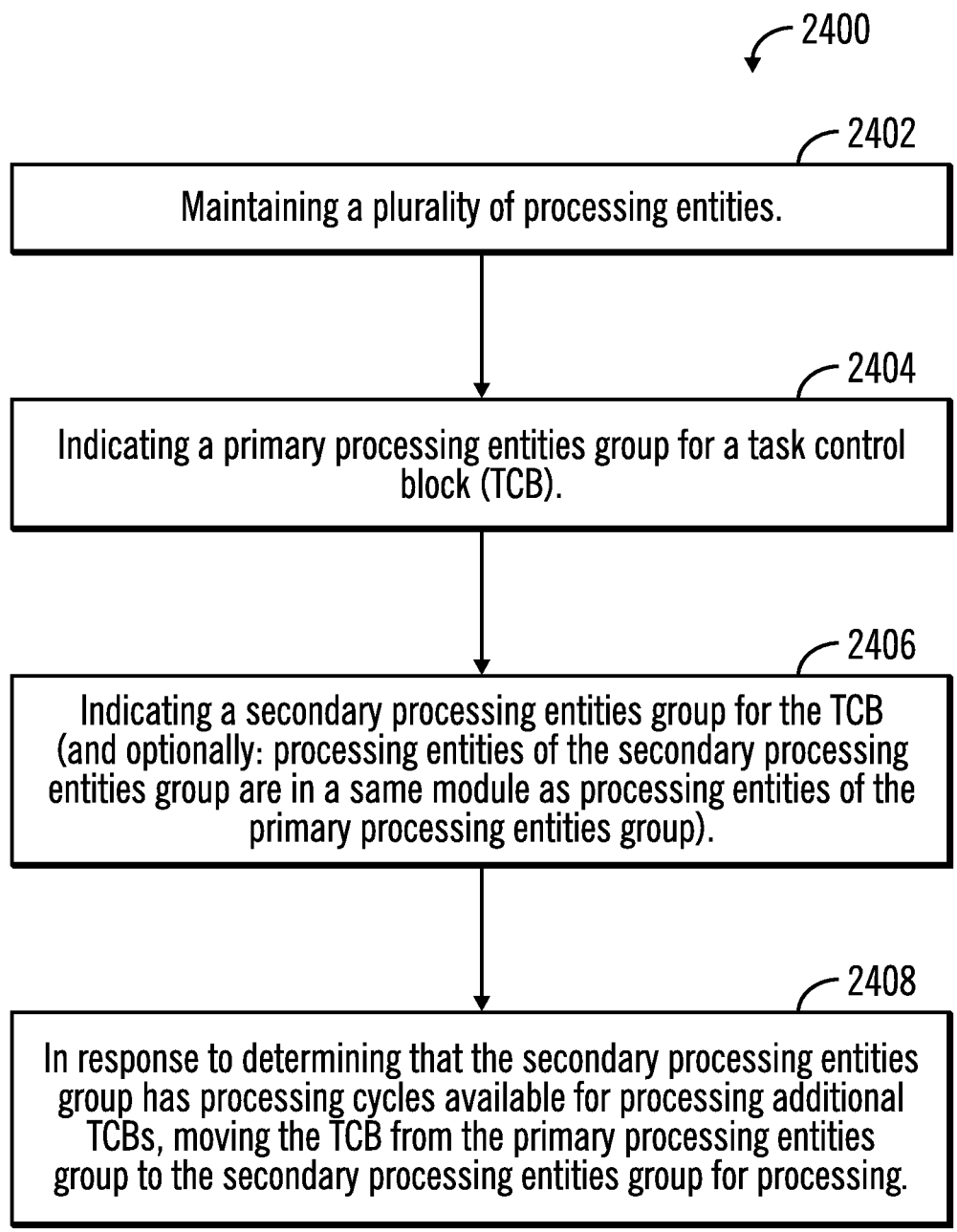
FIG. 24 illustrates a flowchart that shows integration of TCB groups with ordered lists of dispatch queues, in accordance with certain embodiments.

FIG. 24 illustrates a flowchart 2400 that shows integration of TCB groups with ordered lists of dispatch queues, in accordance with certain embodiments. The operations shown in FIG. 15 may be performed by the TCB manager 134 that executes in the server 1700.

Control starts at block 2402 in which the TCB manager 134 maintains a plurality of processing entities in the server 1700. The TCB manager 134 indicates (at block 2404) a primary processing entities group for a TCB.

Control proceeds to block 2406, in which the TCB manager 124 indicates a secondary processing entities group for the TCB, and in certain embodiments the processing entities of the secondary processing entities group are in a same module as the processing entities of the primary processing entities group.

In response to determining that the secondary processing entities group has processing cycles available for processing additional TCBs, the TCB manager moves (at block 2408) the TCB from the primary processing entities group to the secondary processing entities group for processing.

Therefore, FIGS. 17-24 illustrate additional embodiments for integrating the grouping of TCBs and queuing of TCBs for processing entities.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 25:
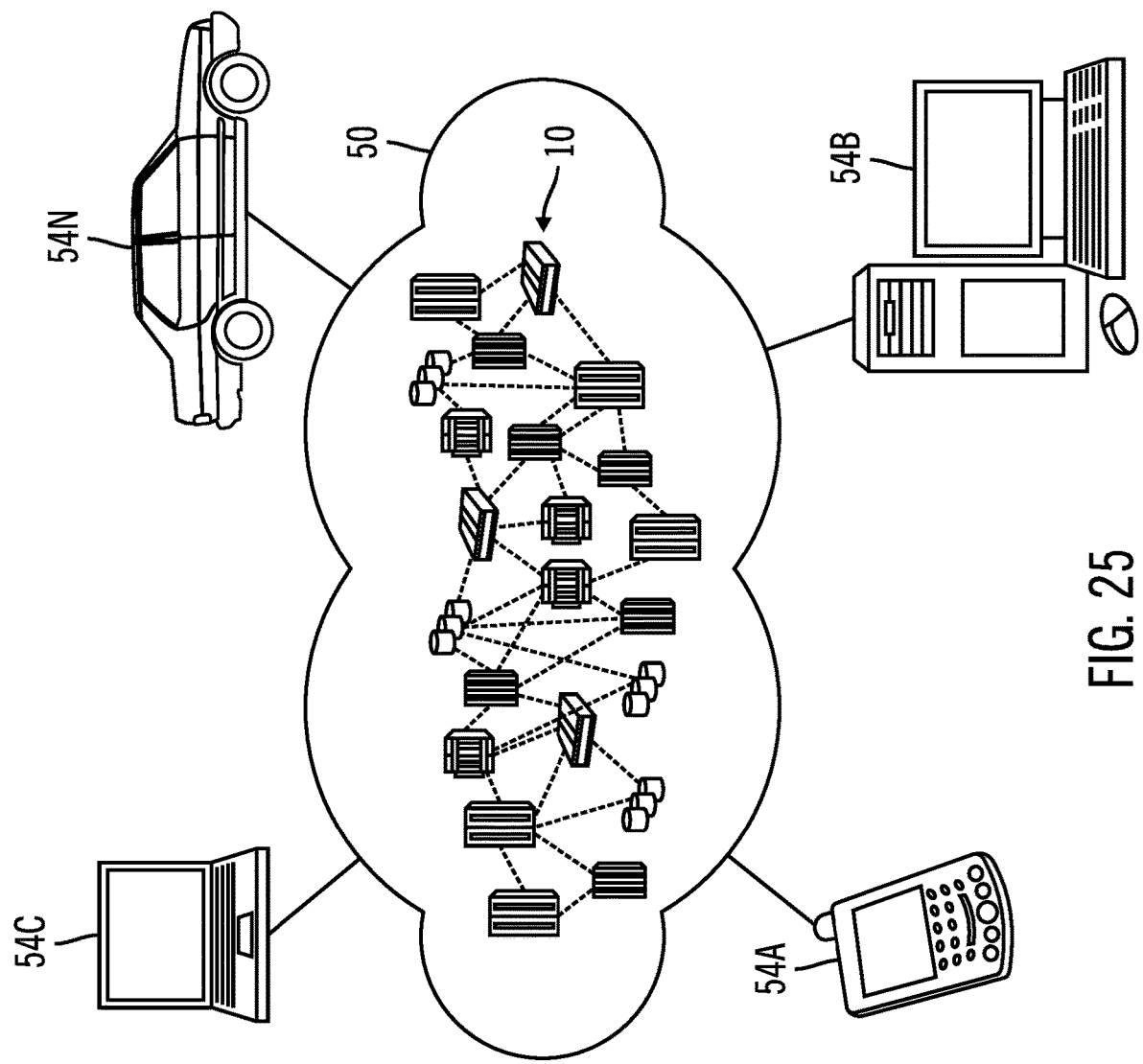
FIG. 25 illustrates a block diagram of a cloud computing environment, in accordance with certain embodiments.

Referring now to FIG. 25, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 25 are intended to be illustrative only and that computing nodes 10 and cloud computing environment 50 can communicate with any type of computerized device over any type of network and/or network addressable connection (e.g., using a web browser).

Figure 26:
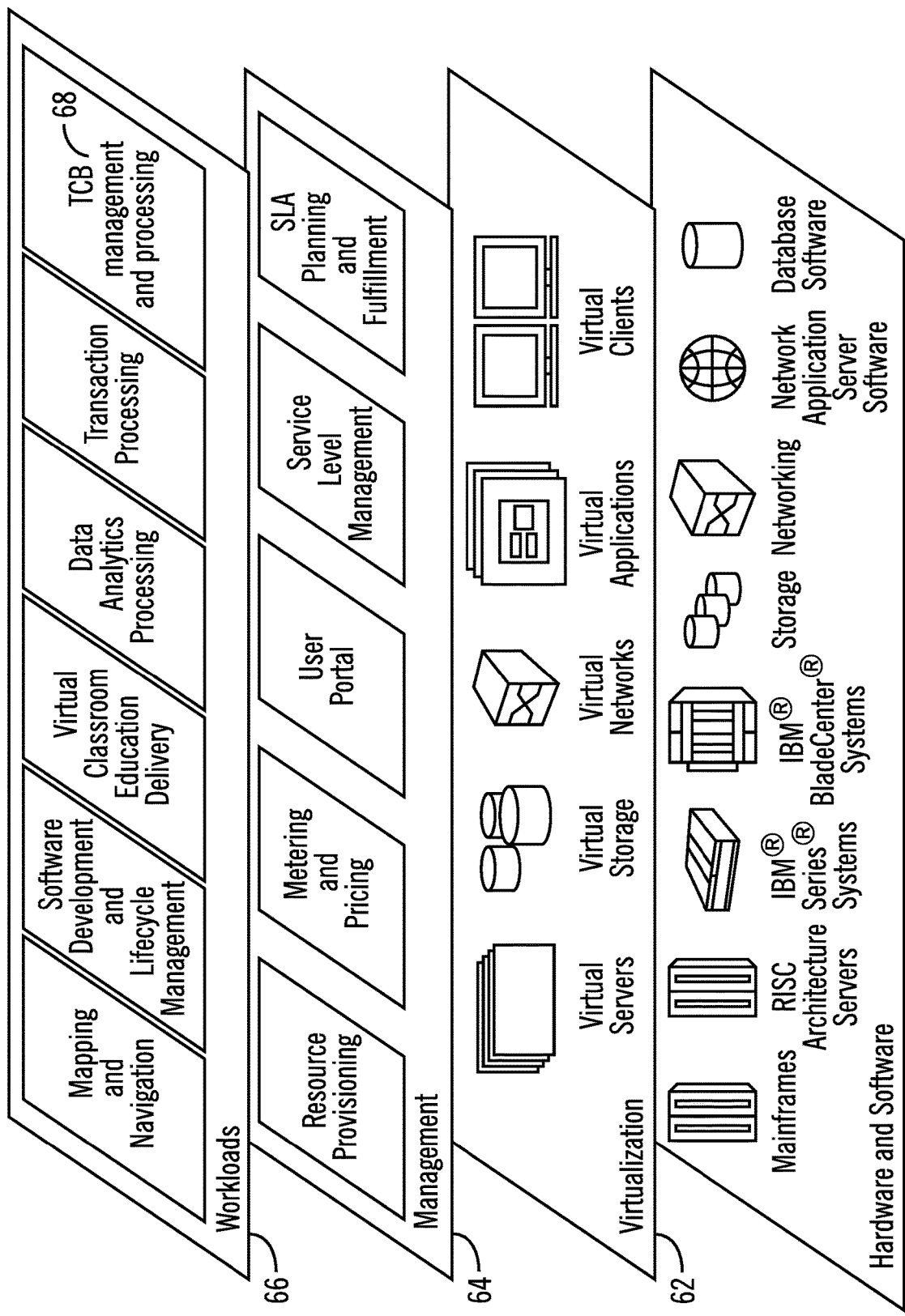
FIG. 26 illustrates a block diagram of further details of the cloud computing environment of FIG. 25, in accordance with certain embodiments.

Referring now to FIG. 26, a set of functional abstraction layers provided by cloud computing environment 50 (FIG. 25) is shown. It should be understood in advance that the components, layers, and functions shown in FIG. 26 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the TCB management and processing 68 as shown in FIGS. 1-25.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 27:
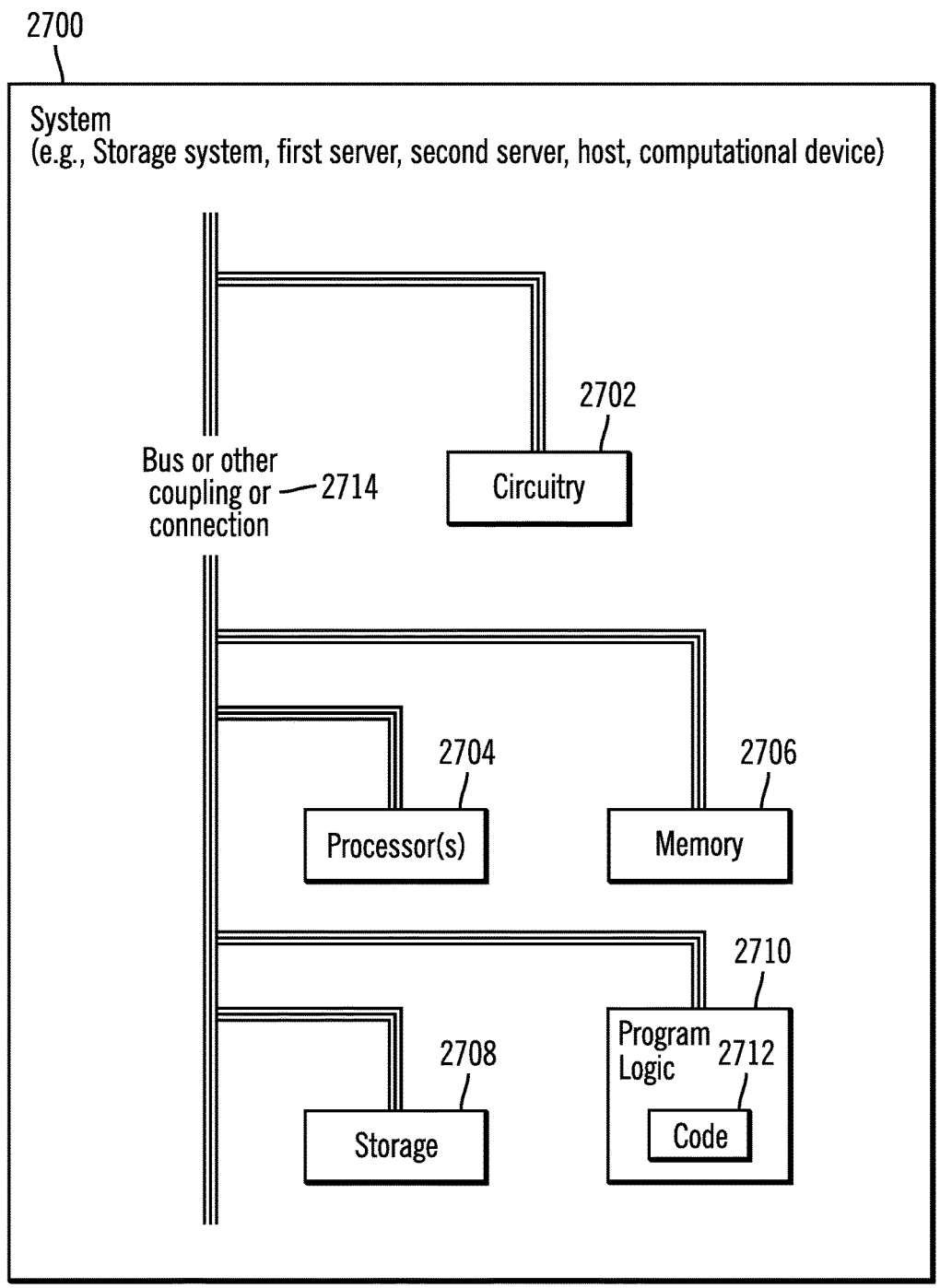
FIG. 27 illustrates a block diagram of a computational system that shows certain elements that may be included in the storage system, servers, and/or the host(s), as described in FIGS. 1-26, in accordance with certain embodiments.

FIG. 27 illustrates a block diagram that shows certain elements that may be included in the storage system 102, the first server 104, the second server 106, the hosts 108, 110 or other computational devices 1000, 1700 in accordance with certain embodiments. The system 2700 may include a circuitry 2702 that may in certain embodiments include at least a processor 2704. The system 2700 may also include a memory 2706 (e.g., a volatile memory device), and storage 2708. The storage 2708 may include a non-volatile memory device (e.g., EEPROM, ROM, PROM, flash, firmware, programmable logic, etc.), magnetic disk drive, optical disk drive, tape drive, etc. The storage 2708 may comprise an internal storage device, an attached storage device and/or a network accessible storage device. The system 2700 may include a program logic 2710 including code 2712 that may be loaded into the memory 2706 and executed by the processor 2704 or circuitry 2702. In certain embodiments, the program logic 2710 including code 2712 may be stored in the storage 2708. In certain other embodiments, the program logic 2710 may be implemented in the circuitry 2702. One or more of the components in the system 2700 may communicate via a bus or via other coupling or connection 2714. Therefore, while FIG. 27 shows the program logic 2710 separately from the other elements, the program logic 2710 may be implemented in the memory 2706 and/or the circuitry 2702.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
maintaining a plurality of processing entities;
generating a plurality of task control block (TCB) groups, wherein each of the plurality of TCB groups are restricted to one or more different processing entities of the plurality of processing entities;
indicating, for a TCB, a primary processing entities group and a secondary processing entities group; and
in response to determining that the secondary processing entities group has processing cycles available for processing additional TCBs, moving the TCB from the primary processing entities group to the secondary processing entities group for processing, wherein allocation of the plurality of processing entities is balanced among the plurality of TCB groups, wherein a selected TCB group is restricted to a maximum number of processing units, wherein beyond the maximum number of processing units there is a slowdown in processing of TCBs of the selected TCB group, and wherein the selected TCB group is allocated to specifically identified processing units that are resident on a same module.

2. The method of claim 1, the method further comprising:
associating a TCB category attribute with each of a plurality of TCBs;
in response to determining that restrictions are to be placed on allocations of processing entities for a newly created TCB, indicating in corresponding TCB category attributes that the newly created TCB is a special type of TCB; and
in response to determining that restrictions are not to be placed on allocations of processing entities for the newly created TCB, indicating in the corresponding TCB category attributes that the newly created TCB is a standard type of TCB.

3. The method of claim 2, the method further comprising:
determining that a selected TCB has to be dispatched for processing;
in response to determining that a TCB category attribute of the selected TCB indicates that the selected TCB is of the special type of TCB, determining the TCB group of the selected TCB and dispatching the selected TCB in accordance with the restrictions on processing entities of the TCB group; and
in response to determining that a TCB category attribute of the selected TCB indicates that the selected TCB is of the standard type of TCB, dispatching the selected TCB to a processing entity that is either allocated or not allocated for processing special type of TCBs.

4. The method of claim 1, wherein a first group of the plurality of TCB groups includes TCBs associated with a first type of operations comprising copy services operations in a storage system, and wherein a second group of the plurality of TCB groups includes TCBs associated with a second type of operations comprising cache management operations in the storage system.

5. The method of claim 4, the method further comprising:
allocating a first set of processing entities for the first group; and
allocating a second set of processing entities for the second group.

6. The method of claim 1, wherein each module includes a plurality of chips having a plurality of cores.

7. A system, comprising:
a memory; and
a processor coupled to the memory, wherein the processor performs operations, the operations comprising:
maintaining a plurality of processing entities;
generating a plurality of task control block (TCB) groups, wherein each of the plurality of TCB groups are restricted to one or more different processing entities of the plurality of processing entities;
indicating, for a TCB, a primary processing entities group and a secondary processing entities group; and
in response to determining that the secondary processing entities group has processing cycles available for processing additional TCBs, moving the TCB from the primary processing entities group to the secondary processing entities group for processing, wherein allocation of the plurality of processing entities is balanced among the plurality of TCB groups, wherein a selected TCB group is restricted to a maximum number of processing units, wherein beyond the maximum number of processing units there is a slowdown in processing of TCBs of the selected TCB group, and wherein the selected TCB group is allocated to specifically identified processing units that are resident on a same module.

8. The system of claim 7, the operations further comprising:
associating a TCB category attribute with each of a plurality of TCBs;
in response to determining that restrictions are to be placed on allocations of processing entities for a newly created TCB, indicating in corresponding TCB category attributes that the newly created TCB is a special type of TCB; and
in response to determining that restrictions are not to be placed on allocations of processing entities for the newly created TCB, indicating in the corresponding TCB category attributes that the newly created TCB is a standard type of TCB.

9. The system of claim 8, the operations further comprising:
determining that a selected TCB has to be dispatched for processing;
in response to determining that a TCB category attribute of the selected TCB indicates that the selected TCB is of the special type of TCB, determining the TCB group of the selected TCB and dispatching the selected TCB in accordance with the restrictions on processing entities of the TCB group; and
in response to determining that a TCB category attribute of the selected TCB indicates that the selected TCB is of the standard type of TCB, dispatching the selected TCB to a processing entity that is either allocated or not allocated for processing special type of TCBs.

10. The system of claim 7, wherein a first group of the plurality of TCB groups includes TCBs associated with a first type of operations comprising copy services operations in a storage system, and wherein a second group of the plurality of TCB groups includes TCBs associated with a second type of operations comprising cache management operations in the storage system.

11. The system of claim 10, the operations further comprising:
   allocating a first set of processing entities for the first group; and
   allocating a second set of processing entities for the second group.

12. The system of claim 7, wherein each module includes a plurality of chips having a plurality of cores.

13. A computer program product, the computer program product comprising a computer readable storage medium having computer readable program code embodied therewith, the computer readable program code configured to perform operations, the operations comprising:
   maintaining a plurality of processing entities;
   generating a plurality of task control block (TCB) groups, wherein each of the plurality of TCB groups are restricted to one or more different processing entities of the plurality of processing entities;
   indicating, for a TCB, a primary processing entities group and a secondary processing entities group; and
   in response to determining that the secondary processing entities group has processing cycles available for processing additional TCBs, moving the TCB from the primary processing entities group to the secondary processing entities group for processing, wherein allocation of the plurality of processing entities is balanced among the plurality of TCB groups, wherein a selected TCB group is restricted to a maximum number of processing units, wherein beyond the maximum number of processing units there is a slowdown in processing of TCBs of the selected TCB group, and wherein the selected TCB group is allocated to specifically identified processing units that are resident on a same module.

14. The computer program product of claim 13, the operations further comprising:
   associating a TCB category attribute with each of a plurality of TCBs;
   in response to determining that restrictions are to be placed on allocations of processing entities for a newly created TCB, indicating in corresponding TCB category attributes that the newly created TCB is a special type of TCB; and
   in response to determining that restrictions are not to be placed on allocations of processing entities for the newly created TCB, indicating in the corresponding TCB category attributes that the newly created TCB is a standard type of TCB.

15. The computer program product of claim 14, the operations further comprising:
   determining that a selected TCB has to be dispatched for processing;
   in response to determining that a TCB category attribute of the selected TCB indicates that the selected TCB is of the special type of TCB, determining the TCB group of the selected TCB and dispatching the selected TCB in accordance with the restrictions on processing entities of the TCB group; and
   in response to determining that a TCB category attribute of the selected TCB indicates that the selected TCB is of the standard type of TCB, dispatching the selected TCB to a processing entity that is either allocated or not allocated for processing special type of TCBs.

16. The computer program product of claim 13, wherein a first group of the plurality of TCB groups includes TCBs associated with a first type of operations comprising copy services operations in a storage system, and wherein a second group of the plurality of TCB groups includes TCBs associated with a second type of operations comprising cache management operations in the storage system.

17. The computer program product of claim 16, the operations further comprising:
   allocating a first set of processing entities for the first group; and
   allocating a second set of processing entities for the second group.

18. The computer program product of claim 13, wherein each module includes a plurality of chips having a plurality of cores.

* * * * *